(12) United States Patent
Lin et al.

(10) Patent No.: US 12,341,602 B2
(45) Date of Patent: Jun. 24, 2025

(54) OPTICAL LINE TERMINAL, OPTICAL NETWORK UNIT, AND OPTICAL COMMUNICATIONS SYSTEM

(71) Applicant: Huawei Technologies Co., Ltd., Shenzhen (CN)

(72) Inventors: Huafeng Lin, Dongguan (CN); Wei Ling, Dongguan (CN); Xiaofei Zeng, Dongguan (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 481 days.

(21) Appl. No.: 17/814,324

(22) Filed: Jul. 22, 2022

(65) Prior Publication Data

US 2022/0360356 A1    Nov. 10, 2022

Related U.S. Application Data

(63) Continuation of application No. PCT/CN2020/128729, filed on Nov. 13, 2020.

(30) Foreign Application Priority Data

Feb. 25, 2020  (CN) .......................... 202010117620.9

(51) Int. Cl.
*H04B 10/00* (2013.01)
*H04B 10/294* (2013.01)
(Continued)

(52) U.S. Cl.
CPC ........ *H04J 14/0246* (2013.01); *H04B 10/294* (2013.01); *H04B 10/572* (2013.01); *H04J 14/025* (2013.01); *H04Q 11/0067* (2013.01)

(58) Field of Classification Search
CPC ................................................... H04B 10/272
See application file for complete search history.

(56) References Cited

U.S. PATENT DOCUMENTS

2005/0172328 A1    8/2005  Park et al.
2008/0298806 A1*  12/2008  Effenberger ........ H04J 14/0226
                                                      398/98
(Continued)

FOREIGN PATENT DOCUMENTS

CN          101569122 A       10/2009
CN          103109476 A        5/2013
(Continued)

OTHER PUBLICATIONS

Chow et al., "Demonstration of Low-Power Bit-Interleaving TDM PON", 2012, ECOC Technical Digest, 2012 OSA (Year: 2012).*

*Primary Examiner* — Daniel G Dobson
(74) *Attorney, Agent, or Firm* — SLATER MATSIL, LLP

(57) ABSTRACT

Embodiments of this application provide an OLT, an ONU, and a system. In a downlink direction, the first OLT is configured to convert received downlink data packets of M1 paths into one downlink optical signal whose wavelength is $\lambda o$, and the first ONU is configured to receive the downlink optical signal, and output a target user data packet after processing the downlink optical signal. In an uplink direction, the first ONU is configured to convert received uplink data packets into an uplink optical signal whose wavelength is $\lambda i$, and the first OLT is configured to receive a plurality of uplink optical signals of different wavelengths, and output user data packets of a corresponding quantity of paths after processing.

20 Claims, 27 Drawing Sheets

(51) Int. Cl.
*H04B 10/572* (2013.01)
*H04J 14/02* (2006.01)
*H04Q 11/00* (2006.01)
*H04J 14/00* (2006.01)

(56) References Cited

U.S. PATENT DOCUMENTS

| | | |
|---|---|---|
| 2009/0317084 A1 | 12/2009 | Kim et al. |
| 2014/0219661 A1* | 8/2014 | Doo ............... H04J 14/0227 398/68 |
| 2016/0269810 A1 | 9/2016 | Chow et al. |
| 2018/0302164 A1 | 10/2018 | Wu et al. |

FOREIGN PATENT DOCUMENTS

| | | | |
|---|---|---|---|
| CN | 103281637 A | 9/2013 | |
| CN | 103634066 A | 3/2014 | |
| CN | 106331908 A | 1/2017 | |
| JP | 2016513901 A | 5/2016 | |
| JP | 2018157518 A | 10/2018 | |

* cited by examiner

OPTICAL LINE TERMINAL, OPTICAL NETWORK UNIT, AND OPTICAL COMMUNICATIONS SYSTEM

CROSS-REFERENCE TO RELATED APPLICATIONS

This application is a continuation of International Application No. PCT/CN2020/128729, filed on Nov. 13, 2020, which claims priority to Chinese Patent Application No. 202010117620.9, filed on Feb. 25, 2020. The disclosures of the aforementioned applications are hereby incorporated by reference in their entireties.

TECHNICAL FIELD

This application relates to the field of optical communications technologies, and in particular, to an optical line terminal, an optical network unit, and an optical communications system.

BACKGROUND

A passive optical network (PON) is a single-fiber bidirectional optical access network using a point-to-multipoint (P2MP) structure. As shown in FIG. 1, a PON includes an optical line terminal (OLT) and an optical distribution network (ODN) on a local side, and an optical network unit (ONU) on a user side. Because PON access can provide a sufficient access bandwidth, and has advantages such as low deployment costs and simple operation and maintenance, the PON access becomes a main solution of current fiber to the home (FITH).

Currently, with full deployment of FITH services, ODN resources of a current network are abundant. Therefore, an operator expects to reuse an FITH ODN to quickly expand and deploy a new service, to implement full-service access through one ODN. However, for a time division multiplexing (TDM)-PON designed for an FITH service scenario, the TDM-PON has typical features such as time division multiplexing, bandwidth aggregation and convergence (1:N convergence), and a power splitter-based point-to-multipoint (P2MP) ODN topology, and has obvious advantages when used in the FITH service scenario. However, when the TMD-PON is used in other new service scenarios that require a latency and reliability, because uplink and downlink use time division multiplexing, the latency and jitter are large.

Therefore, how to reduce the latency and jitter when reusing the FITH ODN to expand and deploy a new service is an urgent problem to be resolved at present.

SUMMARY

Embodiments of this application provide an optical line terminal, an optical network unit, and an optical communications system, to resolve a problem that a latency and jitter are large when an operator currently reuses an FITH ODN to quickly expand and deploy a new service.

To achieve the foregoing objective, the following technical solutions are used in the embodiments of this application.

According to a first aspect, a first optical line terminal OLT is provided. The first OLT includes an electrical multiplexing module, a first optical modulator, and N2 uplink optical receivers, where N2 is a positive integer greater than 1. The electrical multiplexing module is configured to receive downlink data frames of M1 paths, and multiplex the downlink data frames of the M1 paths into one high-speed downlink bit stream, where M1 is a positive integer. The first optical modulator is configured to convert the high-speed downlink bit stream into a physical electrical signal, and then modulate the physical electrical signal into a downlink optical signal whose wavelength is Xo. Each optical receiver in the N2 uplink optical receivers separately receives uplink optical signals of different wavelengths. When the first OLT provided in the embodiments of this application reuses an FITH ODN to expand and deploy a new service, in an uplink direction, different uplink optical receivers separately receive uplink optical signals of different wavelengths, so that each user is equivalent to performing point-to-point data transmission through a dedicated channel. In a downlink direction, because the first OLT multiplexes the downlink data frames of the M1 paths into one high-speed downlink bit stream in a downlink time division broadcast manner, the first ONU can extract one target downlink bit stream belonging to the first ONU from the high-speed downlink bit stream. Therefore, receiving on a first ONU side does not need a tunable filter, which greatly reduces wavelength resources and costs. In addition, from a perspective of a user, each user can continuously receive downlink data packets, which is equivalent to that each user receives downlink data through the dedicated channel. In other words, transmission of data transmitted based on the optical communications system including the first OLT is equivalent to transmission on the dedicated channel. Therefore, compared with the conventional technology, the solution in this application can avoid a problem that a latency and jitter are large because time division multiplexing is used in both uplink and downlink. In addition, different wavelengths are designed for different uplink optical signals, to avoid a problem that system reliability is affected due to a risk of rogue ONUs, thereby improving the system reliability. In conclusion, based on the first OLT provided in the embodiments of this application, the latency and jitter can be reduced, and the system reliability can be improved. In addition, an operator can be supported to use the FITH ODN to quickly expand and deploy a new service, such as a high-reliability and low-latency service, thereby implementing full-service access on an access network.

With reference to the first aspect, in a possible implementation, rates of the downlink data frames of the M1 paths are all D, and a rate of the high-speed downlink bit stream is M1×D. This solution can simplify the design.

With reference to the first aspect, in a possible implementation, the electrical multiplexing module is specifically configured to multiplex the downlink data frames of the M1 paths into one high-speed downlink bit stream in a bit interleaving manner, where the high-speed downlink bit stream includes one or a plurality of M1 bit groups, and the one M1 bit group or a $k^{th}$ M1 bit group in the plurality of M1 bit groups includes a $k^{th}$ bit in the downlink data frames of the M1 paths. Based on this solution, the downlink data frames of the M1 paths may be multiplexed into one high-speed downlink bit stream.

With reference to the first aspect, in a possible implementation, the first OLT further includes protocol processors of N1 paths, where N1 is a positive integer greater than or equal to M1. The protocol processors of the N1 paths are configured to receive downlink data packets of M1 paths, and output the downlink data frames of the M1 paths after separately processing the downlink data packets of the M1 paths. The protocol processors of the N1 paths are further configured to receive uplink electrical signals of N2 paths, recover the uplink electrical signals of the N2 paths into uplink data frames of N2 paths, and then complete parsing and protocol processing of the uplink data frames of the N2 paths, to obtain user data packets of the N2 paths. Based on this solution, in the downlink direction, the downlink data frames of the M1 paths can be obtained. In the uplink direction, the user data packets of the N2 paths can be recovered.

With reference to the first aspect, in a possible implementation, N1=M1, so that the protocol processors of the N1 paths can be used to the maximum extent.

With reference to the first aspect, in a possible implementation, N1=N2, so that the protocol processors of the N1 paths can be used to the maximum extent.

With reference to the first aspect, in a possible implementation, the first OLT further includes other N3 uplink optical receivers in addition to the N2 uplink optical receivers, N3 is a positive integer, and N1=N2+N3, where a channel in which the other N3 uplink optical receivers are located is a management and backup channel. In this way, reliability and robustness of the optical communications system in which the first OLT is located can be improved, to ensure service quality and security.

With reference to the first aspect, in a possible implementation, $\lambda o=1370+/-10$ nm. Wavelengths of uplink optical signals of different wavelengths are from 1530 to 1540 nm (including 1530 nm and 1540 nm).

According to a second aspect, a first optical network unit ONU is provided. The first ONU includes a downlink optical receiver, an electrical demultiplexing module, and a second optical modulator. The downlink optical receiver is configured to receive a downlink optical signal whose wavelength is $\lambda o$, and convert the downlink optical signal into a downlink electrical signal. The electrical demultiplexing module is configured to recover the downlink electrical signal into a high-speed downlink bit stream, and extract one target downlink bit stream belonging to the electrical demultiplexing module from the high-speed downlink bit stream. The second optical modulator is configured to receive an uplink bit stream, convert the uplink bit stream into a physical electrical signal, and modulate the physical electrical signal into an uplink optical signal whose wavelength is $\lambda i$, where $\lambda i$ is different from $\lambda t$, and $\lambda t$ is a wavelength of another uplink optical signal received by a first OLT connected to the first ONU. When the first ONU provided in the embodiments of this application reuses an FITH ODN to expand and deploy a new service, different uplink optical signals are designed in an uplink direction to ensure that the first OLT connected to the first ONU can separately receive uplink optical signals of different wavelengths by using different uplink optical receivers, which is equivalent to that each user performs point-to-point data transmission through a dedicated channel. In a downlink direction, because the first OLT multiplexes downlink data frames of M1 paths into one high-speed downlink bit stream in a downlink time division broadcast manner, the first ONU can extract one target downlink bit stream belonging to the first ONU from the high-speed downlink bit stream. Therefore, receiving on a first ONU side does not need a tunable filter, which greatly reduces wavelength resources and costs. In addition, from a perspective of a user, each user can continuously receive downlink data packets, which is equivalent to that each user receives downlink data through the dedicated channel. In other words, transmission of data transmitted based on the optical communications system including the first ONU is equivalent to transmission on the dedicated channel. Therefore, compared with the conventional technology, the solution in this application can avoid a problem that a latency and jitter are large because time division multiplexing is used in both uplink and downlink. In addition, different wavelengths are designed for different uplink optical signals, to avoid a problem that system reliability is affected due to a risk of rogue ONUs, thereby improving the system reliability. In conclusion, based on the first ONU provided in the embodiments of this application, the latency and jitter can be reduced, and the system reliability can be improved. In addition, an operator can be supported to use the FITH ODN to quickly expand and deploy a new service, such as a high-reliability and low-latency service, thereby implementing full-service access on an access network.

With reference to the second aspect, in a possible implementation, the high-speed downlink bit stream includes one or a plurality of M1 bit groups, and the one M1 bit group or a $k^{th}$ M1 bit group in the plurality of M1 bit groups includes a $k^{th}$ bit in the downlink data frames of the M1 paths. The electrical demultiplexing module is specifically configured to extract, from the high-speed downlink bit stream in a bit deinterleaving manner, one target downlink bit stream belonging to the electrical demultiplexing module, where the target downlink bit stream includes a corresponding bit in the one M1 bit group or in each bit group in the plurality of M1 bit groups. Based on this solution, the target downlink bit stream belonging to the electrical demultiplexing module can be extracted from the high-speed downlink bit stream.

With reference to the second aspect, in a possible implementation, $\lambda i$ is configured according to a configuration instruction sent by the first OLT in the downlink direction.

With reference to the second aspect, in a possible implementation, $\lambda o=1370+/-10$ nm. Both $\lambda i$ and $\lambda t$ are from 1530 to 1540 nm.

According to a third aspect, an optical communications system is provided. The optical communications system includes the first OLT according to the first aspect, a plurality of first ONUs according to the second aspect, and an ODN connecting the first OLT and the first ONUs. For a technical effect of the third aspect, refer to the first aspect or the second aspect. Details are not described herein again.

In a possible implementation, the optical communications system further includes a second OLT, a coexistence multiplexer/demultiplexer connecting the first OLT and the second OLT, and one or more second ONUs, where the ODN is further configured to connect the second OLT and the second ONU, the second OLT is an OLT in a fiber to the home FTTH passive optical network PON system, and the second ONU is connected to an FTTH user. Based on this solution, coexistence of a PON system designed for a low-latency high-reliability service provided in the embodiments of this application and a TDM-PON system currently designed for an FTTH service scenario can be implemented.

DETAILED DESCRIPTION OF ILLUSTRATIVE EMBODIMENTS

The following describes an OLT, an ONU, and an optical communications system in the embodiments of this application with reference to the accompanying drawings in the embodiments of this application. In the descriptions of this application, "/" indicates an "or" relationship between associated objects unless otherwise specified. For example, A/B may represent A or B. In this application, "and/or" describes only an association relationship for describing associated objects and represents that three relationships may exist. For example, A and/or B may represent the following three cases: Only A exists, both A and B exist, and only B exists. In the three cases, A and B may be singular or plural. In addition, in the descriptions of this application, "a plurality of" means two or more than two unless otherwise specified. "At least one of the following items (pieces)" or a similar expression thereof means any combination of these items, including any combination of singular item (piece) or plural items (pieces). For example, at least one of a, b, or c may indicate: a, b, c, a and b, a and c, b and c, or a, b, and c, where a, b, and c may be singular or plural. In addition, for ease of clearly describing the technical solutions in the embodiments of this application, in the embodiments of this application, terms such as "first" and "second" are used to distinguish between same items or similar items whose functions and purposes are basically the same. A person skilled in the art may understand that the terms such as "first" and "second" do not limit a quantity and an execution sequence, and the terms such as "first" and "second" do not indicate a definite difference. In addition, in the embodiments of this application, the term such as "example" or "for example" is used to represent giving an example, an illustration, or a description. Any embodiment or design scheme described as an "example" or "for example" in the embodiments of this application should not be explained as being more preferred or having more advantages than another embodiment or design scheme. Exactly, use of the term "example", "for example", or the like is intended to present a relative concept in a specific manner for ease of understanding.

Figure 1:
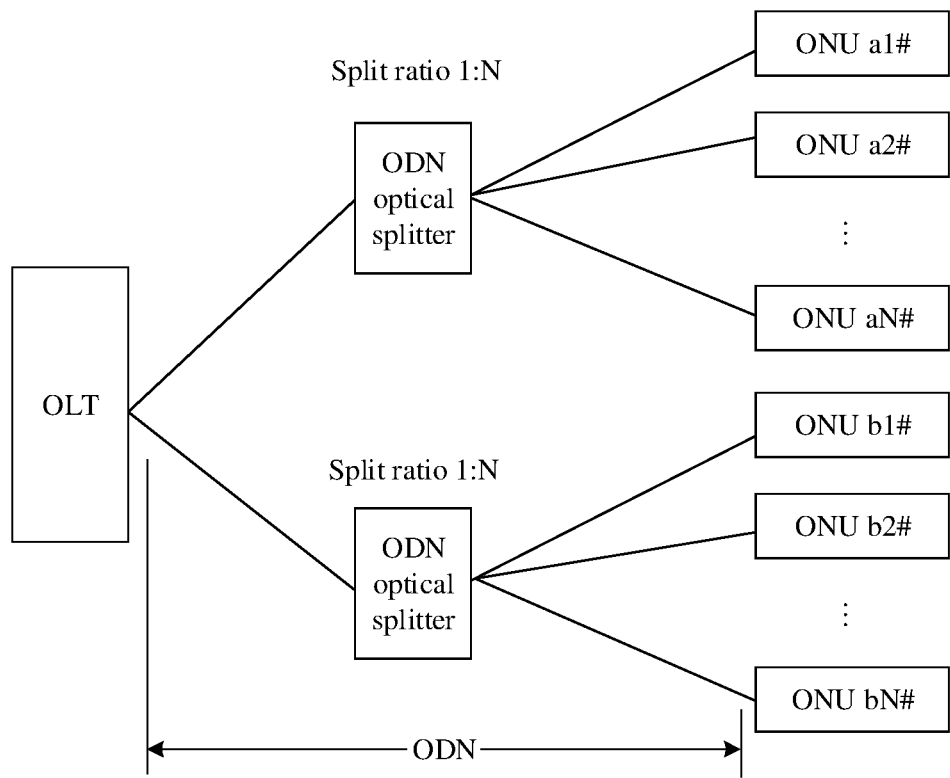
FIG. 1 is a schematic diagram of an existing PON architecture.
Figure 2A:
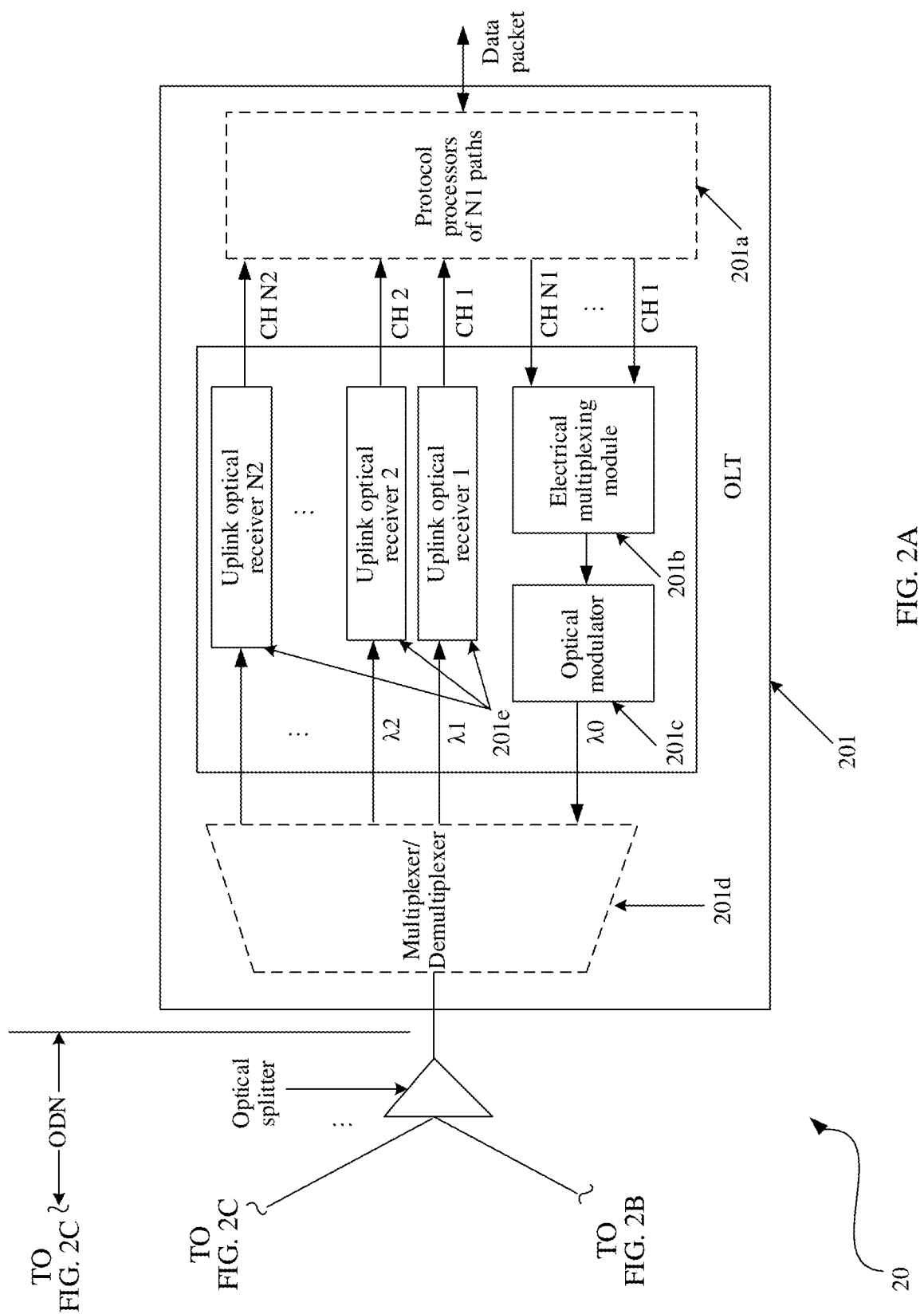
FIG. 2A to FIG. 2C are a schematic diagram of a structure of an optical communications system according to an embodiment of this application.
Figure 2B:
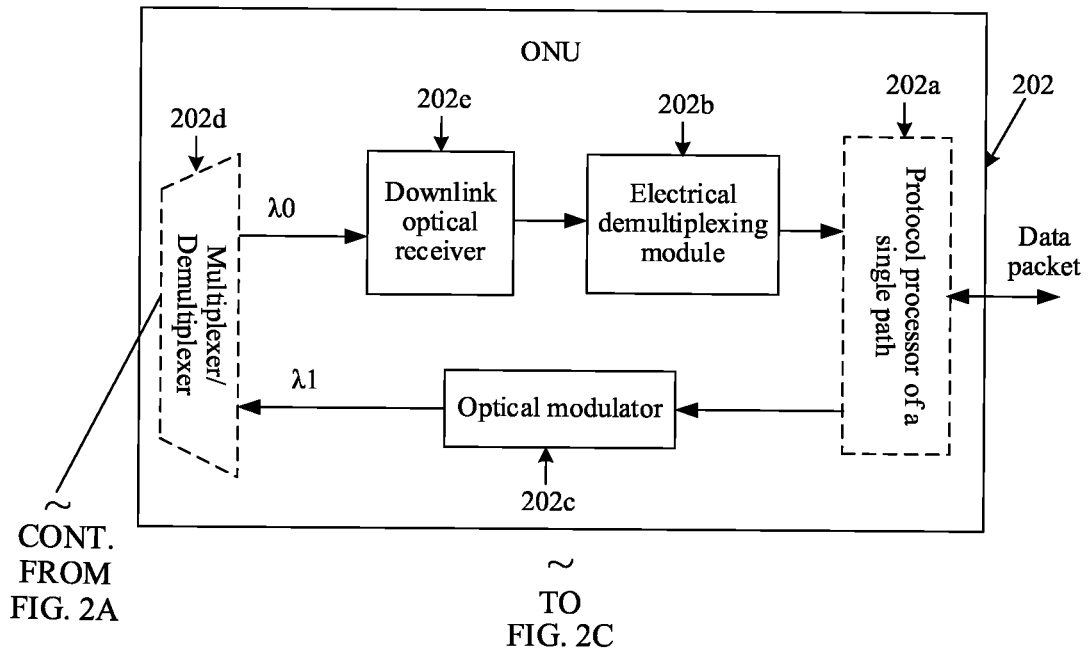
Figure 2C:
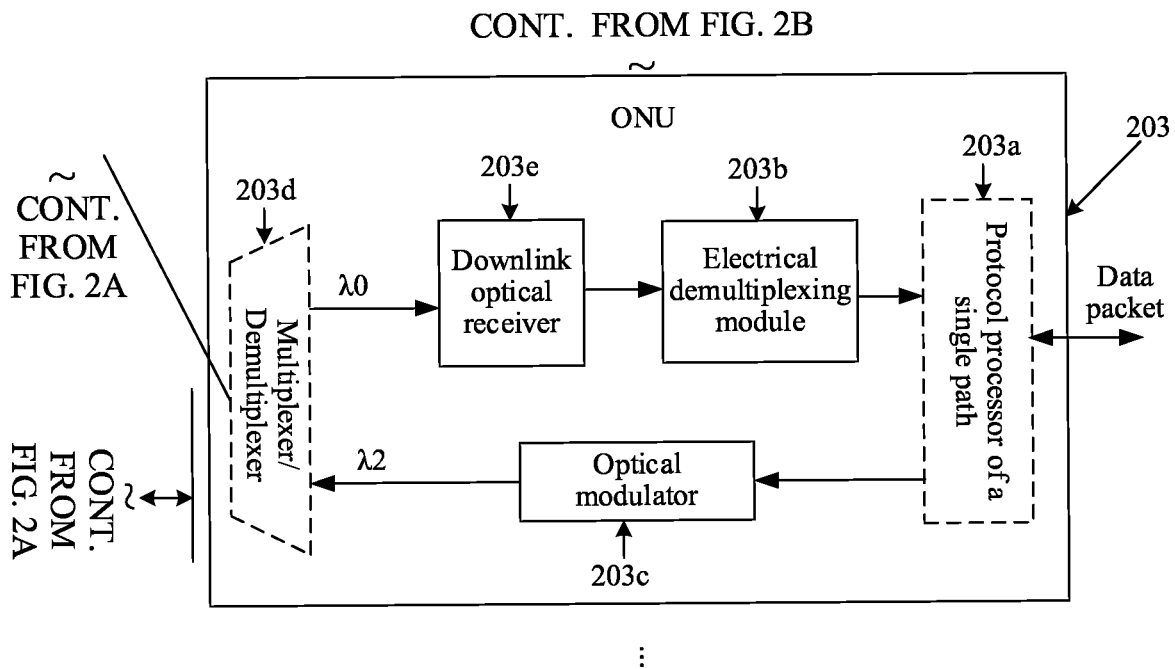

As shown in FIG. 2A to FIG. 2C, an optical communications system 20 is provided in an embodiment of this application. The optical communications system 20 includes a first OLT (an OLT 201 in FIG. 2A to FIG. 2C), a plurality of first ONUs (an ONU 202, an ONU 203, and the like in FIG. 2A to FIG. 2C), and an ODN connecting the first OLT and the first ONUs. The ODN includes passive components such as an optical splitter, an optical fiber, and a connector (not shown). The first OLT includes an electrical multiplexing module, a first optical modulator, and N2 uplink optical receivers. N2 is a positive integer greater than 1. The first ONU includes an electrical demultiplexing module, a second optical modulator, and a downlink optical receiver.

For example, the OLT 201 in FIG. 2A to FIG. 2C includes an electrical multiplexing module 201b, an optical modulator 201c, and N2 uplink optical receivers 201e (for example, an uplink optical receiver 1, an uplink optical receiver 2, . . . , and an uplink optical receiver N2 in FIG. 2A to FIG. 2C).

For example, the ONU 202 in FIG. 2A to FIG. 2C includes an electrical demultiplexing module 202b, an optical modulator 202c, and a downlink optical receiver 202e.

For example, the ONU 203 in FIG. 2A to FIG. 2C includes an electrical demultiplexing module 203b, an optical modulator 203c, and a downlink optical receiver 203e.

In this embodiment of this application, the electrical multiplexing module is configured to receive downlink data frames of M1 paths, and multiplex the downlink data frames of the M1 paths into one high-speed downlink bit stream, where M1 is a positive integer. The first optical modulator is configured to convert the high-speed downlink bit stream into a physical electrical signal, and then modulate the physical electrical signal into a downlink optical signal whose wavelength is $\lambda o$. Each optical receiver in the N2 uplink optical receivers separately receives uplink optical signals of different wavelengths.

In a possible implementation, that the electrical multiplexing module is specifically configured to multiplex the downlink data frames of the M1 paths into one high-speed downlink bit stream includes: The electrical multiplexing module is configured to multiplex the downlink data frames of the M1 paths into one high-speed downlink bit stream in a bit interleaving manner, where the high-speed downlink bit stream includes one or a plurality of M1 bit groups, and the one M1 bit group or a $k^{th}$ M1 bit group in the plurality of M1 bit groups includes a $k^{th}$ bit in the downlink data frames of the M1 paths.

In this embodiment of this application, the downlink optical receiver is configured to receive a downlink optical signal whose wavelength is $\lambda o$, and convert the downlink optical signal into a downlink electrical signal. The electrical demultiplexing module is configured to recover the downlink electrical signal into the high-speed downlink bit stream, and then extract one target downlink bit stream belonging to the electrical demultiplexing module from the high-speed downlink bit stream. The second optical modulator is configured to: after receiving an uplink bit stream and converting the uplink bit stream into a physical electrical signal, modulate the physical electrical signal into an uplink optical signal whose wavelength is $\lambda i$, where $\lambda i$ is different from $\lambda t$, and $\lambda t$ is a wavelength of another uplink optical signal received by the first OLT connected to the first ONU.

In a possible implementation, the electrical demultiplexing module is specifically configured to extract, from the high-speed downlink bit stream in a bit deinterleaving manner, one target downlink bit stream belonging to the electrical demultiplexing module, where the target downlink bit stream includes a corresponding bit in the one M1 bit group or in each bit group in the plurality of M1 bit groups.

Optionally, in this embodiment of this application, the first OLT may further include protocol processors of N1 paths. N1 is a positive integer greater than or equal to M1. The first ONU may further include a protocol processor of a single path.

For example, the OLT 201 in FIG. 2A to FIG. 2C may further include protocol processors 201a of N1 paths.

For example, the ONU 202 in FIG. 2A to FIG. 2C may further include a protocol processor 202a of a single path.

For example, the ONU 203 in FIG. 2A to FIG. 2C may further include a protocol processor 203a of a single path.

In this embodiment of this application, in a downlink direction, the protocol processors of the N1 paths are configured to receive downlink data packets of M1 paths, and output the downlink data frames of the M1 paths after separately processing the downlink data packets of the M1 paths. In an uplink direction, the protocol processors of the N1 paths are further configured to receive uplink electrical signals of N2 paths, recover the uplink electrical signals of the N2 paths into uplink data frames of N2 paths, and then complete parsing and protocol processing of the uplink data frames of the N2 paths, to obtain user data packets of the N2 paths.

In this embodiment of this application, in the downlink direction, a protocol processor of a single path is configured to: after recovering the target downlink bit stream into a target downlink data frame, complete parsing and protocol processing of the target downlink data frame, to obtain a target user data packet. In the uplink direction, the protocol processor of the single path is configured to receive an uplink data packet, and output an uplink bit stream of the single path after processing the uplink data packet.

It should be noted that, in this embodiment of this application, the protocol processors of the N1 path and/or the protocol processor of the single path may be replaced by another module, provided that a replacement module has a corresponding function. This is uniformly described herein. This is not specifically limited in this embodiment of this application.

Optionally, in this embodiment of this application, the first OLT may further include a first multiplexer/demultiplexer. The first ONU may further include a second multiplexer/demultiplexer.

For example, the OLT 201 in FIG. 2A to FIG. 2C may further include a multiplexer/demultiplexer 201d.

For example, the ONU 202 in FIG. 2A to FIG. 2C may further include a multiplexer/demultiplexer 202d.

For example, the ONU 203 in FIG. 2A to FIG. 2C may further include a multiplexer/demultiplexer 203d.

In this embodiment of this application, in the downlink direction, the first multiplexer/demultiplexer is configured to couple the downlink optical signal whose wavelength is $\lambda o$ to a main optical fiber in the ODN. In the downlink direction, the first multiplexer/demultiplexer is configured to receive N2 uplink optical signals of different wavelengths from the main optical fiber, and respectively output the N2 uplink optical signals of different wavelengths to different uplink optical receivers in the N2 uplink optical receivers.

In this embodiment of this application, in the downlink direction, the second multiplexer/demultiplexer is configured to receive the downlink optical signal whose wavelength is $\lambda o$ from the main optical fiber, and output the downlink optical signal whose wavelength is $\lambda o$. In the uplink direction, the second multiplexer/demultiplexer is configured to couple the uplink optical signal whose wavelength is $\lambda i$ to the main optical fiber in the ODN.

It should be noted that, in this embodiment of this application, the first multiplexer/demultiplexer and/or the second multiplexer/demultiplexer may be replaced by another module, provided that a replacement module has a corresponding function. This is uniformly described herein. This is not specifically limited in this embodiment of this application.

It should be noted that FIG. 2A to FIG. 2C lists only two first ONUs for example. If the optical communications system 20 includes more than two first ONUs, for a structure of another first ONU, refer to the ONU 202 or the ONU 203 shown in FIG. 2A to FIG. 2C. Details are not described herein again.

The following separately describes operating principles of the first OLT and the first ONU with reference to the optical communications system 20 shown in FIG. 2A to FIG. 2C. In a Downlink Data Direction:

The protocol processors 201a of the N1 paths are configured to receive downlink data packets of M1 paths, and output the downlink data frames of the M1 paths after separately processing the downlink data packets of the M1 paths, where M1 is a positive integer less than or equal to N1.

Optionally, in this embodiment of this application, processing performed by the protocol processors 201a of the N1 paths on the downlink data packets includes but is not limited to protocol processing and frame encapsulation. This is uniformly described herein, and is not described below again.

As shown in FIG. 2A to FIG. 2C, there are N1 channels between a channel 1 (CH 1 for short) to a channel N1 (CH N1 for short) between the protocol processors 201a of the N1 paths and the electrical multiplexing module 201b in FIG. 2A to FIG. 2C. The downlink data frames of the M1 paths are transmitted on M1 channels of the N1 channels.

Optionally, in this embodiment of this application, M1=N1, so that the protocol processors 201a of the N1 paths can be used to the maximum extent.

The electrical multiplexing module 201b is configured to: receive the downlink data frames of the M1 paths from the protocol processors 201a of the N1 paths, and output the high-speed downlink bit stream after multiplexing the downlink data frames of the M1 paths into the high-speed downlink bit stream.

Optionally, in this embodiment of this application, the electrical multiplexing module 201b may multiplex the downlink data frames of the M1 paths into one high-speed downlink bit stream in the bit interleaving (bit interleaving) manner. The high-speed downlink bit stream includes one or a plurality of M1 bit groups, and the one M1 bit group or a $k^{th}$ M1 bit group in the plurality of M1 bit groups includes a $k^{th}$ bit in the downlink data frames of the M1 paths.

In this embodiment of this application, the bit interleaving means that a code element is separated in terms of time in a time division multiplexing manner, and time between bit interleaving may be filled by a code element of another codeword. For example, for some 4-bit message groups, first bits are separately extracted from four message groups to form a new 4-bit group which is referred to as a first frame. Second bits are separately extracted from the four message groups to form a new 4-bit group which is referred to as a second frame. Third bits are separately extracted from the four message groups to form a new 4-bit group which is referred to as a third frame. Fourth bits are separately extracted from the four message groups to form a new 4-bit group which is referred to as a fourth frame.

In this embodiment of this application, a rate of the high-speed downlink bit stream is equal to a sum of rates of all downlink data frames in the downlink data frames of the M1 paths. For example, assuming that the rates of the downlink data frames of the M1 paths are respectively D1, D2, . . . , and DM1, the rate of the high-speed downlink bit stream=D1+D2+ . . . +DM1.

In a possible implementation in this embodiment of this application, the rates of the downlink data frames of the M1 paths are all D, and the rate of the high-speed downlink bit stream is M1×D.

The optical modulator 201c is configured to output the downlink optical signal after receiving the high-speed downlink bit stream from the electrical multiplexing module 201b and modulating the high-speed downlink bit stream into the downlink optical signal whose wavelength is λo.

Optionally, in this embodiment of this application, the optical modulator 201c may first convert the high-speed downlink bit stream into the physical electrical signal, and then modulate the physical electrical signal into the downlink optical signal whose wavelength is 0. This is not specifically limited in this embodiment of this application.

Figure 3A:
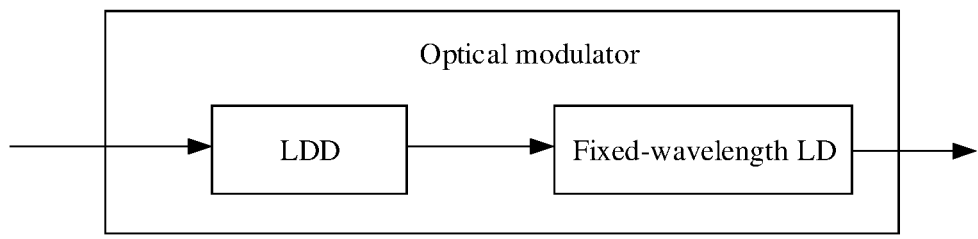
FIG. 3a is a schematic diagram of a structure of a first optical modulator according to an embodiment of this application.

In a possible implementation, as shown in FIG. 3a, the optical modulator 201c in this embodiment of this application may include a laser diode driver (LDD) and a fixed-wavelength laser diode (LD). The LDD is used to convert the high-speed downlink bit stream into the physical electrical signal, and the fixed-wavelength LD is used to modulate the physical electrical signal into the downlink optical signal whose wavelength is λo. Certainly, a structure of the optical modulator 201c in this embodiment of this application may alternatively be another structure. This is not specifically limited in this embodiment of this application.

In this case, a digital signal input from the protocol processors 201a of the N1 paths is converted into an optical signal.

Further, the multiplexer/demultiplexer 201d is configured to receive the downlink optical signal from the optical modulator 201c, and couple the downlink optical signal to the main optical fiber in the ODN.

The downlink optical signal transmitted through the main optical fiber enters the optical splitter in the ODN shown in FIG. 2A to FIG. 2C, and after splitting by the optical splitter, the downlink optical signal is separately input to M1 first ONUs corresponding to the downlink data packets of the M1 paths. The following uses an example in which the first ONU is the ONU 202 in FIG. 2A to FIG. 2C for description.

The multiplexer/demultiplexer 202d is configured to receive the downlink optical signal whose wavelength is λo from the main optical fiber, and output the downlink optical signal whose wavelength is λo after separating the downlink optical signal whose wavelength is λo.

The downlink optical receiver 202e is configured to receive the downlink optical signal from the multiplexer/demultiplexer 202d, and output the downlink electrical signal after converting the downlink optical signal into the downlink electrical signal. Optionally, the downlink optical receiver 202e may further amplify the downlink electrical signal obtained by converting the downlink optical signal, to output the amplified downlink electrical signal. This is not specifically limited in this embodiment of this application.

Figure 4:
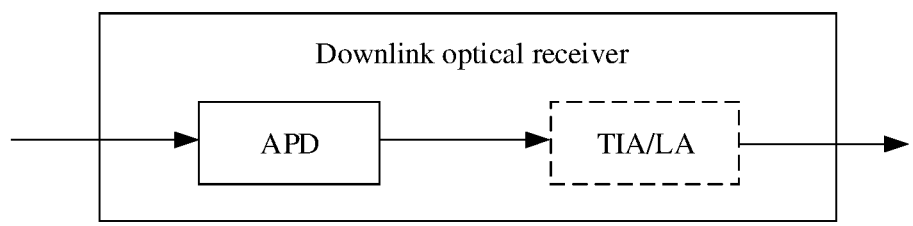
FIG. 4 is a schematic diagram of a structure of an optical receiver according to an embodiment of this application.

In a possible implementation, as shown in FIG. 4, the downlink optical receiver 202e in this embodiment of this application may include an avalanche photodiode (APD) and a trans-impedance amplifier (TIA)/line amplifier (LA). The APD is used to convert the downlink optical signal into the downlink electrical signal, and the TIA/LA is used to amplify the downlink electrical signal. The TIA/LA is an optional module in the downlink optical receiver 202e, and may not be disposed in the downlink optical receiver 202e, but disposed between the downlink optical receiver 202e and the electrical demultiplexing module 202b. Alternatively, the ONU 202 may not include the TIA/LA (that is, the downlink electrical signal obtained by converting the downlink optical signal does not need to be amplified). This is uniformly described herein, and is not described below again. Certainly, a structure of the downlink optical receiver 202e in this embodiment of this application may alternatively be another structure. This is not specifically limited in this embodiment of this application.

In this case, the optical signal is converted into an electrical signal.

The electrical demultiplexing module 202b is configured to receive the downlink electrical signal from the downlink optical receiver 202e, recover the downlink electrical signal into the high-speed downlink bit stream, extract the target downlink bit stream belonging to the electrical demultiplexing module 202b from the high-speed downlink bit stream, and output the target downlink bit stream.

Optionally, in this embodiment of this application, the electrical demultiplexing module 202b may extract, from the high-speed downlink bit stream in the bit deinterleaving manner, the target downlink bit stream belonging to the electronic domain demultiplexing module 202b. This is not specifically limited in this embodiment of this application.

In this embodiment of this application, the bit deinterleaving refers to periodically extracting one bit based on a fixed interval.

In this embodiment of this application, a rate of the target downlink bit stream in the ONU 202 is the same as a rate of one downlink data frame that corresponds to the ONU 202 and that is in the downlink data frames of the M1 paths. In other words, the electrical demultiplexing module 202b may recover one target downlink bit stream corresponding to a target user.

In this case, the electrical signal is converted into a digital signal.

The protocol processor 202a of the single path is configured to: after receiving the target downlink bit stream from the electrical demultiplexing module 202b and recovering the target downlink bit stream into the target downlink data frame, complete parsing and protocol processing of the target downlink data frame, to obtain the target user data packet.

It should be noted that, in the foregoing embodiment, an example in which the first ONU is the ONU 202 in FIG. 2A to FIG. 2C is used for description. If the first ONU is another ONU corresponding to the ONU 203 in FIG. 2A to FIG. 2C or the downlink data packets of the M1 paths, an operating principle of the another ONU is similar to the operating principle of the ONU 202. Details are not described herein again.

In an uplink data direction:

An example in which the first ONU is the ONU 202 in FIG. 2A to FIG. 2C is used for description.

The protocol processor 202a of the single path is configured to receive an uplink data packet, and output an uplink bit stream of the single path after processing the uplink data packet.

Optionally, in this embodiment of this application, processing performed by the protocol processor 202a of the single path on the uplink data packet includes but is not limited to protocol processing, frame encapsulation, and conversion from a frame to a bit stream. This is uniformly described herein, and is not described below again.

The optical modulator 202c is configured to output the uplink optical signal after receiving the uplink bit stream from the protocol processor 202a of the single path and modulating the uplink bit stream into an uplink optical signal whose wavelength is $\lambda 1$.

Optionally, in this embodiment of this application, the optical modulator 202c may first convert the uplink bit stream into a physical electrical signal, and then modulate the physical electrical signal into the uplink optical signal whose wavelength is $\lambda 1$. This is not specifically limited in this embodiment of this application.

Figure 3B:
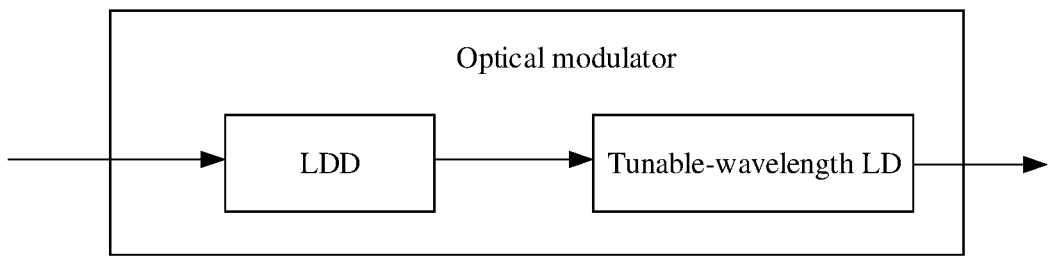
FIG. 3b is a schematic diagram of a structure of a second optical modulator according to an embodiment of this application.

In a possible implementation, as shown in FIG. 3b, the optical modulator 202c in this embodiment of this application may include an LDD and a tunable-wavelength LD. The LDD is used to convert the uplink bit stream into the physical electrical signal, and the tunable wavelength LD is used to modulate the physical electrical signal into the uplink optical signal whose wavelength is Xi. Certainly, a structure of the optical modulator 202c in this embodiment of this application may alternatively be another structure. This is not specifically limited in this embodiment of this application.

In this case, a digital signal input from the protocol processor 202a of the single path is converted into an optical signal.

The multiplexer/demultiplexer 202d is configured to receive an uplink optical signal from the optical modulator 202c, and couple the uplink optical signal to the main optical fiber in the ODN.

If an example in which the first ONU is the ONU 203 in FIG. 2A to FIG. 2C is used for description, an operating principle of the ONU 203 is similar to the operating principle of the ONU 202, and a difference is, for example, that in this embodiment of this application, the optical modulator 202c is configured to modulate the uplink bit stream into the uplink optical signal whose wavelength is $\lambda 1$, while the optical modulator 203c is configured to modulate the uplink bit stream into an uplink optical signal whose wavelength is $\lambda 2$, where $\lambda 1$ is not equal to $\lambda 2$, that is, wavelengths of optical signals in the ONU 202 and the ONU 203 are different.

Certainly, if the first ONU is another ONU with a same structure, an operating principle of the first ONU is similar to that of the ONU 202 or the ONU 203 except that wavelengths of the uplink optical signals modulated by the optical modulator are different. Details are not described herein again.

Optionally, in this embodiment of this application, $\lambda o=1370+/-10$ nm. Wavelengths of N2 uplink optical signals of different wavelengths are from 1530 to 1540 nm, where N2 is a positive integer less than or equal to N1.

Further, the N2 uplink optical signals of different wavelengths (assuming that the uplink optical signal whose wavelength is $\lambda 1$ and that is output by the ONU 202 and the uplink optical signal whose wavelength is $\lambda 2$ and that is output by the ONU 203 are included) enter the main optical fiber after being split by the optical splitter in the ODN shown in FIG. 2A to FIG. 2C.

The multiplexer/demultiplexer 201d is configured to receive the N2 uplink optical signals of different wavelengths from the main optical fiber, and respectively output the N2 uplink optical signals of different wavelengths to different uplink optical receivers of the N2 uplink optical receivers 201e, where N2 different wavelengths are not equal to $\lambda o$.

For example, the uplink optical signal whose wavelength is $\lambda 1$ and that is output by the ONU 202 may be output to the uplink optical receiver 1 in FIG. 2A to FIG. 2C, the uplink optical signal whose wavelength is $\lambda 2$ and that is output by the ONU 203 may be output to the uplink optical receiver 2 in FIG. 2A to FIG. 2C, and the like.

Each uplink optical receiver 201e of the N2 uplink optical receivers is separately configured to convert an input uplink optical signal into an uplink electrical signal, and output the uplink electrical signal. Optionally, the uplink optical receiver 201e may further amplify the uplink electrical signal obtained by converting the uplink optical signal, to output the amplified uplink electrical signal. This is not specifically limited in this embodiment of this application. For a structure of the uplink optical receiver 201e, refer to the structure of the downlink optical receiver 202e. Details are not described herein again.

In this case, the optical signal is converted into an electrical signal.

As shown in FIG. 2A to FIG. 2C, one channel exists between each of the N2 uplink optical receivers 201e and the protocol processors 201a of the N1 paths. For example, a channel 1 (CH 1 for short) exists between the uplink optical receiver 1 and the protocol processors 201a of the N1 paths, a channel 2 (CH 2 for short) exists between the uplink optical receiver 2 and the protocol processors 201a of the N1 paths, . . . , and a channel N2 (CH N2 for short) exists between the uplink optical receiver N2 and the protocol processors 201a of the N1 paths. The uplink electrical signal processed by each of the N2 uplink optical receivers 201e is respectively input to the protocol processors 201a of the N1 paths through corresponding N2 channels.

The protocol processors 201a of the N1 paths are further configured to: after receiving uplink electrical signals of N2 paths from the N2 uplink optical receivers and recovering the uplink electrical signals of the N2 paths into the uplink data frames of the N2 paths, complete parsing and protocol processing of the uplink data frames of the N2 paths, to obtain the user data packets of the N2 paths.

In this case, the electrical signal is converted into a digital signal.

It can be learned from the foregoing operating principles of the first OLT and the first ONU in the downlink data direction and the uplink data direction that the optical communications system 20 in this embodiment of this application may implement conversion from a digital signal to an optical signal to an electrical signal to a digital signal.

When the optical communications system provided in this embodiment of this application reuses an FITH ODN to expand and deploy a new service, different uplink optical signals are designed in the uplink direction to ensure that the first OLT connected to the first ONU can separately receive uplink optical signals of different wavelengths by using different uplink optical receivers, which is equivalent to that each user performs point-to-point (P2P) data transmission through a dedicated channel. In the downlink direction, because the first OLT multiplexes the downlink data frames of the M1 paths into one high-speed downlink bit stream in a downlink time division broadcast manner, the first ONU can extract one target downlink bit stream belonging to the first ONU from the high-speed downlink bit stream. Therefore, receiving on a first ONU side does not need a tunable filter, which greatly reduces wavelength resources and costs. In addition, from a perspective of a user, each user can continuously receive downlink data packets, which is equivalent to that each user receive downlink data through the dedicated channel. In other words, the optical communications system 20 shown in FIG. 2A to FIG. 2C is a time and wavelength division multiplexing optical access system (TWDM OAS) (that is, downlink time division and uplink wavelength division). Transmission of data transmitted based on the optical communications system is equivalent to transmission on the dedicated channel. Therefore, compared with the conventional technology, the solution in this application can avoid a problem that a latency and jitter are large because time division multiplexing is used in both uplink and downlink. In addition, different wavelengths are designed for different uplink optical signals, to avoid a problem that system reliability is affected due to a risk of rogue ONUs, thereby improving the system reliability. In conclusion, based on the communications system provided in this embodiment of this application, the latency and jitter can be reduced, and the system reliability can be improved. In addition, an operator can be supported to use the FTTH ODN to quickly expand and deploy a new service, such as a high-reliability and low-latency service, thereby implementing full-service access on an access network.

Based on the optical communications system shown in FIG. 2A to FIG. 2C, in a possible implementation in this embodiment of this application, $N1=N2$.

Figure 5A:
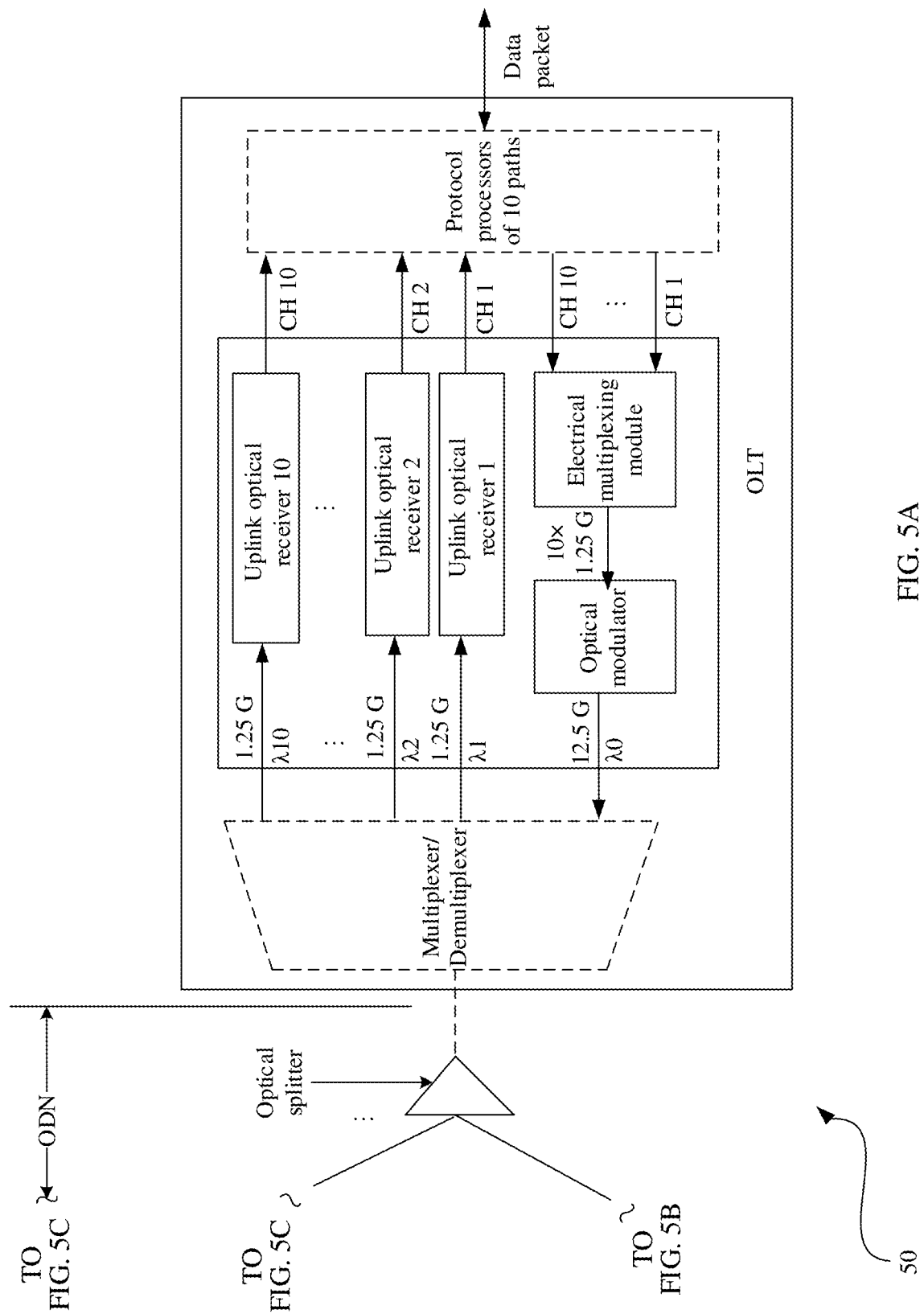
FIG. 5A to FIG. 5C are a first example of an optical communications system according to an embodiment of this application.
Figure 5B:
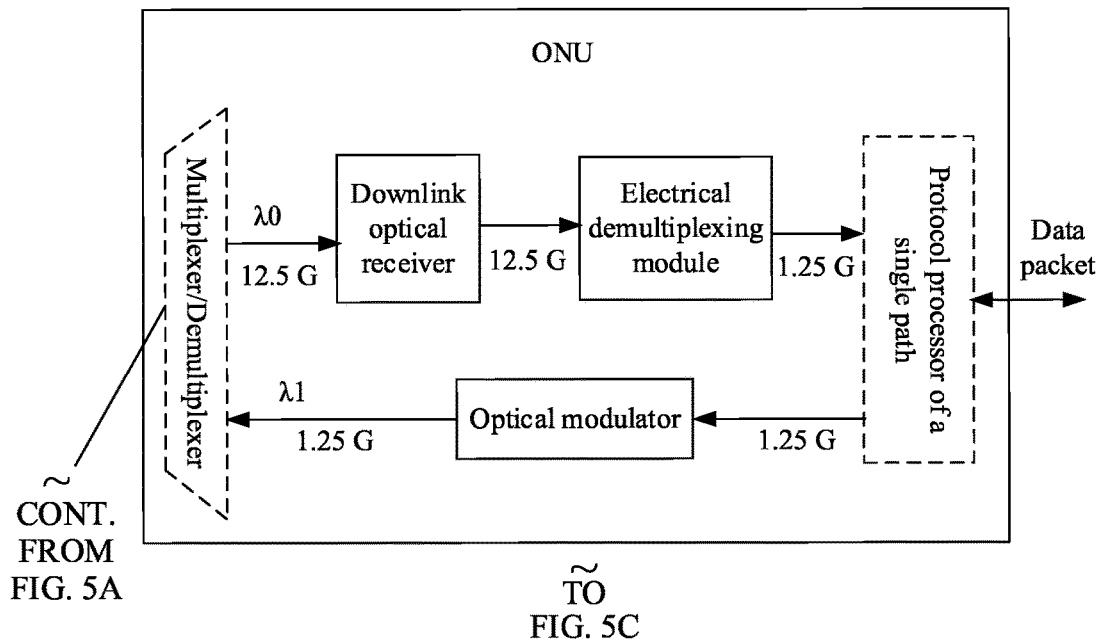
Figure 5C:
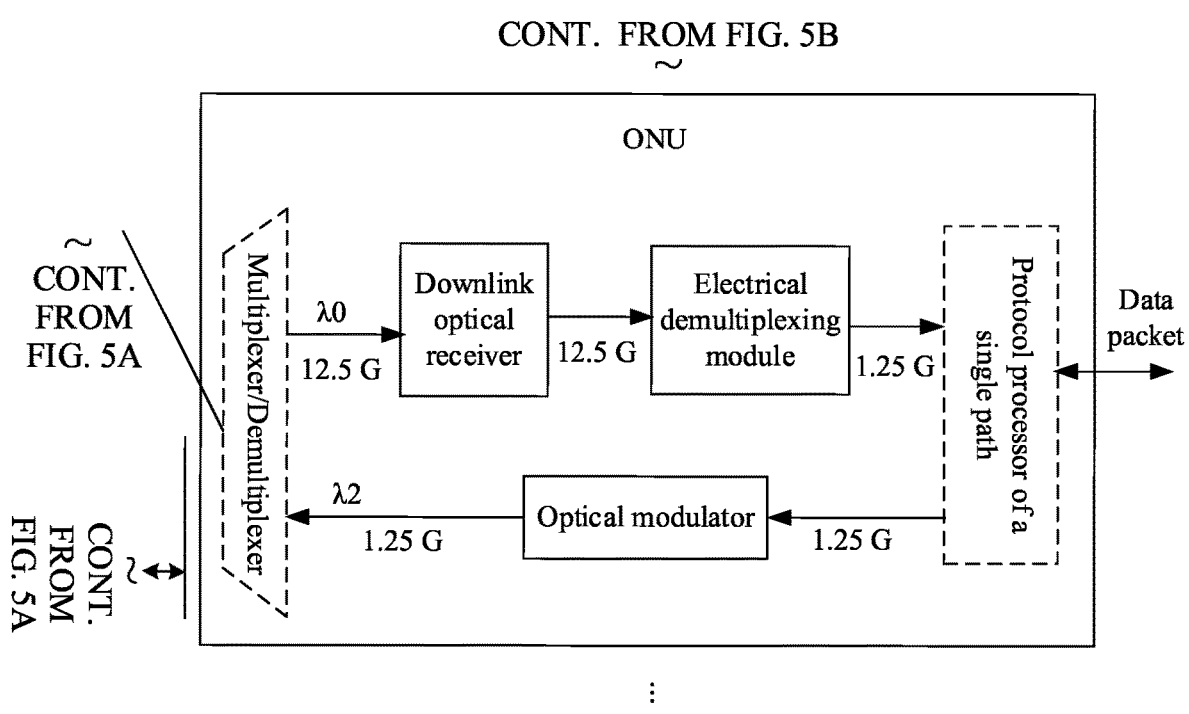

For example, in an optical communications system 50 shown in FIG. 5A to FIG. 5C, $N1=N2=M1=10$. Assuming that rates of downlink data frames of to paths are 1.25 G, the rate of the high-speed downlink bit stream is $10 \times 1.25$ G=12.5 G. In addition, in the optical communications system 50 shown in FIG. 5A to FIG. 5C, an example in which a rate of a downlink data frame corresponding to each user is the same as a rate of an uplink data frame is used for description, that is, the rate of the uplink data frame corresponding to each user is also 1.25 G.

Figure 6A:
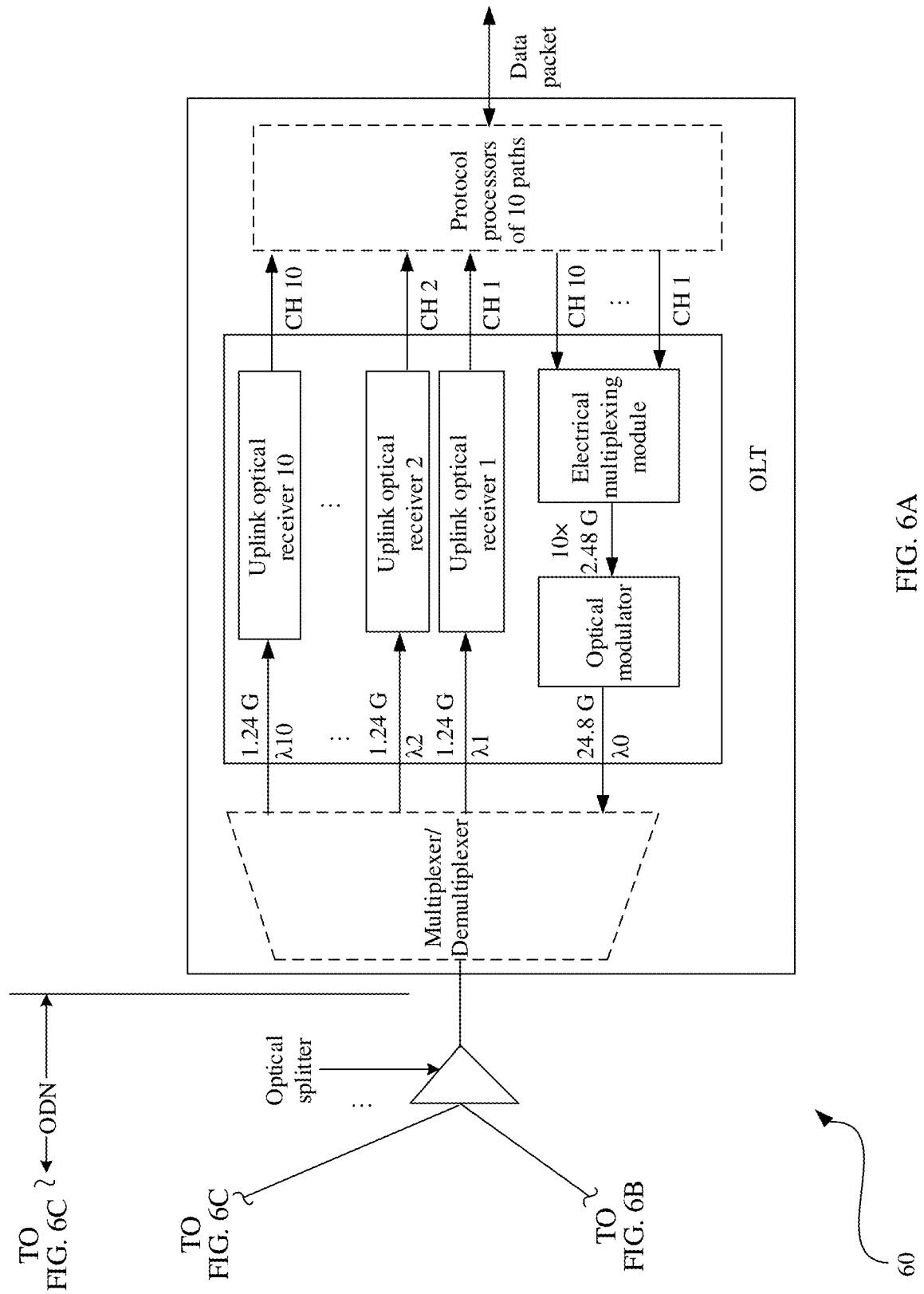
FIG. 6A to FIG. 6C are a second example of an optical communications system according to an embodiment of this application.
Figure 6B:
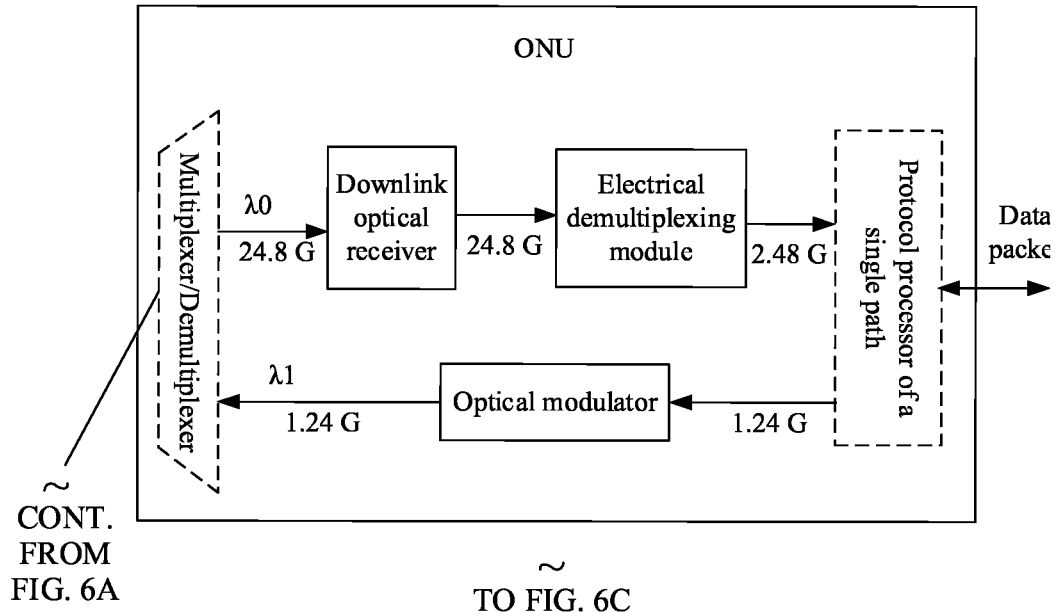
Figure 6C:
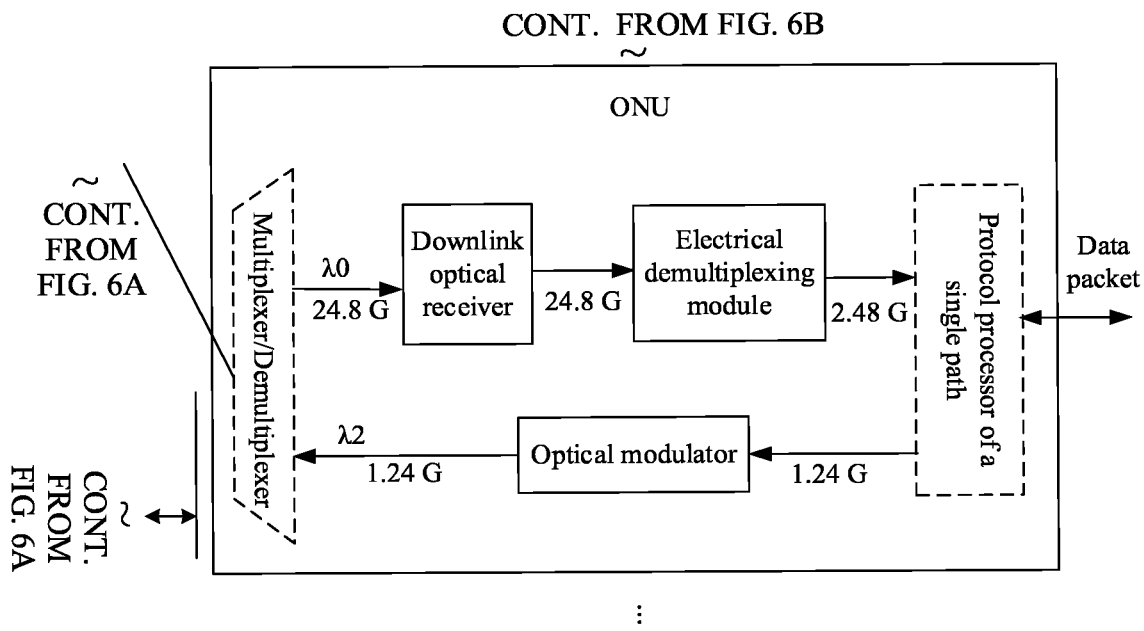

Alternatively, for example, in an optical communications system 60 shown in FIG. 6A to FIG. 6C, $N1=N2=M1=10$. Assuming that rates of downlink data frames of to paths are 2.48 G, the rate of the high-speed downlink bit stream is $10 \times 2.48$ G=24.8 G. In addition, in the optical communications system 50 shown in FIG. 5A to FIG. 5C, an example in which a rate of a downlink data frame corresponding to each user is different from a rate of an uplink data frame is used for description. For example, the rate of the uplink data frame corresponding to each user is 1.24 G.

The optical communications system shown in FIG. 5A to FIG. 5C or FIG. 6A to FIG. 6C may provide P2P gigabit Ethernet (GE) channels of 10 paths with low latency and exclusive bandwidth, to carry services such as an enterprise leased line and a wireless bearer. Different from the optical communications system 50 shown in FIG. 5A to FIG. 5C, in the optical communications system 6o shown in FIG. 6A to FIG. 6C, because a rate of a downlink data frame of each path is improved, both the optical modulator of the first OLT and the downlink optical receiver of the first ONU need to use an optoelectronic chip with a higher bandwidth.

It should be noted that, in FIG. 5A to FIG. 5C and FIG. 6A to FIG. 6C, a quantity N1 of the protocol processors, a quantity M1 of multiplexed channels, the rate of the downlink data frame of each path, and whether rates of uplink and downlink data are symmetrical are merely examples used to describe an architecture and an operating principle of the optical communications system provided in this embodiment of this application. This does not therefore limit the quantity N1 of the protocol processors, the quantity M1 of the multiplexed channels, the rate of the downlink data frame of each path, and whether the rates of the uplink and downlink data are symmetrical in the optical communications system provided in this embodiment of the present invention. For example, the rate of the downlink data frame or the rate of the uplink data frame corresponding to each user may also be determined according to service requirements of different users. This is uniformly described herein, and is not described below again.

To further improve reliability and robustness of the optical communications system, and ensure service quality and security, in another possible implementation in this embodiment of this application, $N2<N1$. Correspondingly, the first OLT further includes other N3 uplink optical receivers in addition to the N2 uplink optical receivers, where N3 is a positive integer, and $N1=N2+N3$. A channel in which the other N3 uplink optical receivers are located is a management and backup channel. Optionally, the management and backup channel mainly have two functions: On one hand, the management and backup channel is used for initial registration, authentication, and online after the first ONU is powered on. After the registration and online are completed, the newly online first ONU is allocated to a dedicated channel of the first ONU according to scheduling management (the first ONU adjusts a quantity of selected channels by using the electrical demultiplexing module in the downlink direction, and adjusts a wavelength of an uplink optical signal by using the optical modulator in the uplink direction). On the other hand, when a wavelength of the uplink optical signal on the first ONU is mismatched, which interferes with normal operating of a data channel, the management and backup channel is used as a backup channel.

Figure 7A:
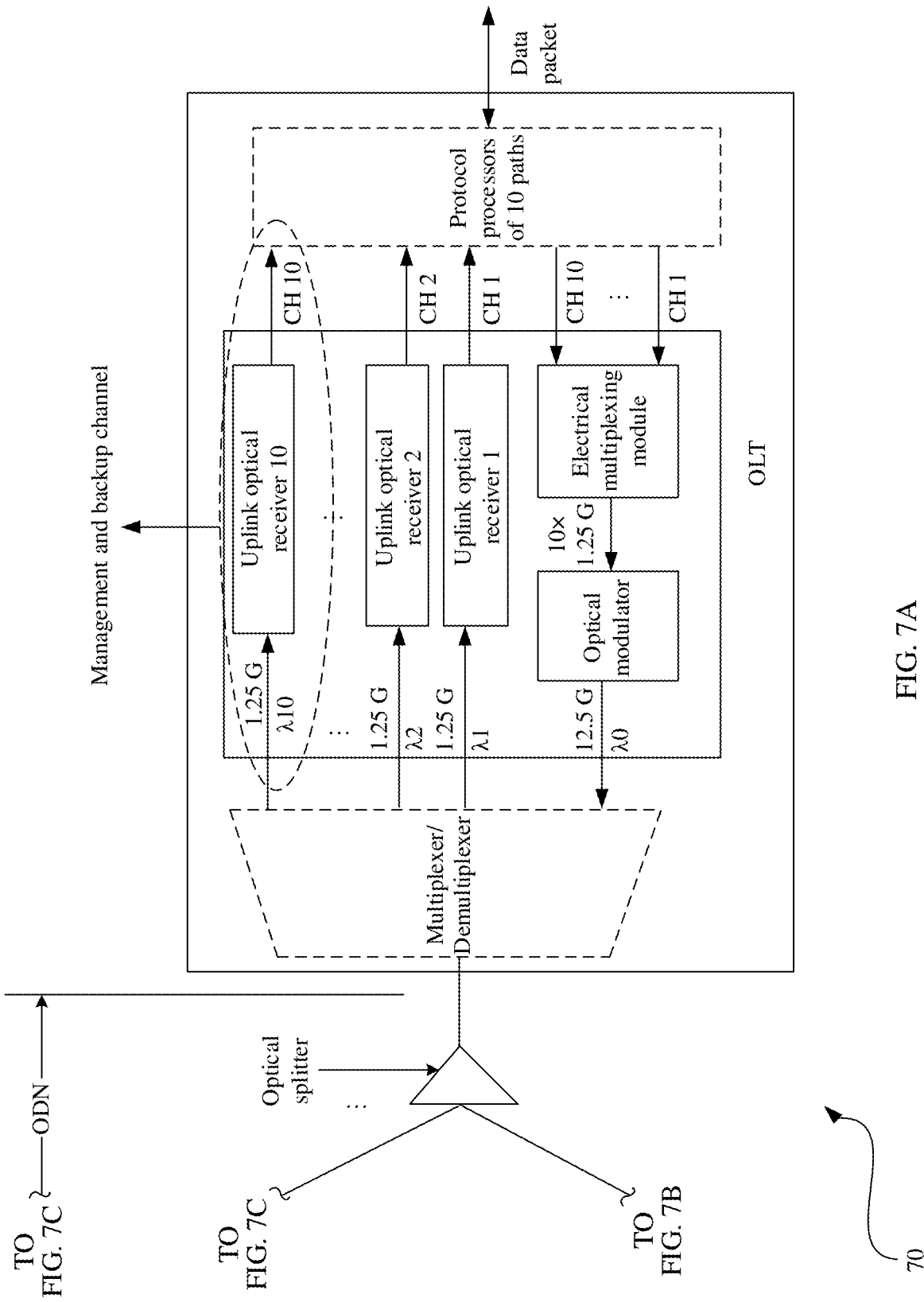
FIG. 7A to FIG. 7C are a third example of an optical communications system according to an embodiment of this application.
Figure 7B:
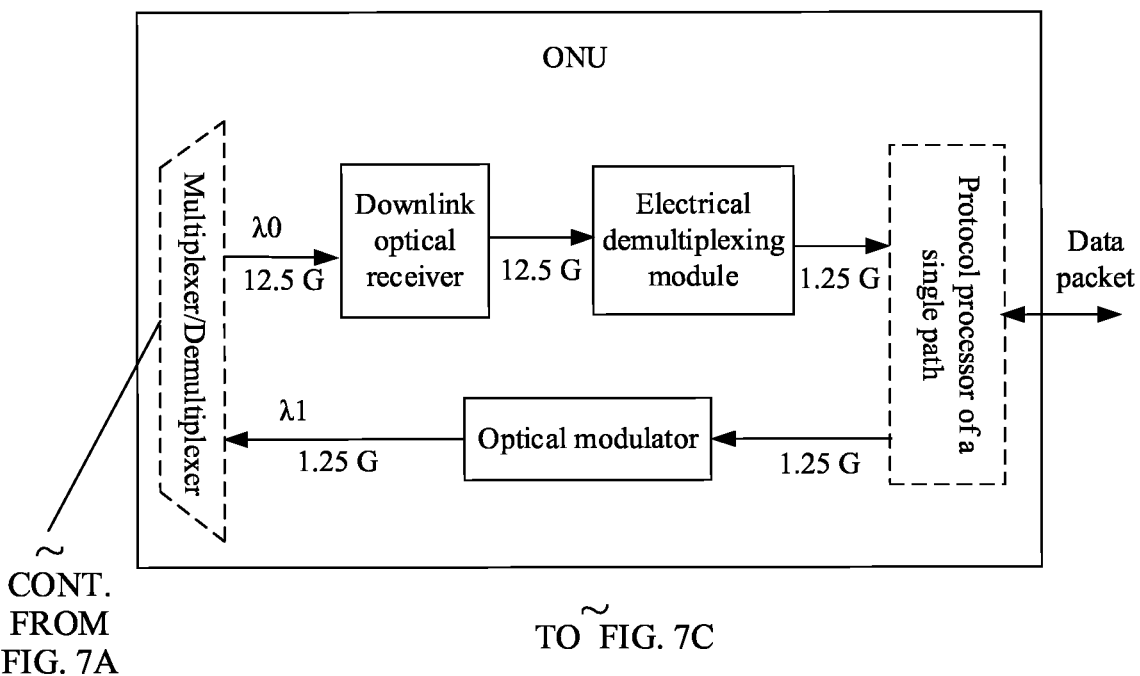
Figure 7C:
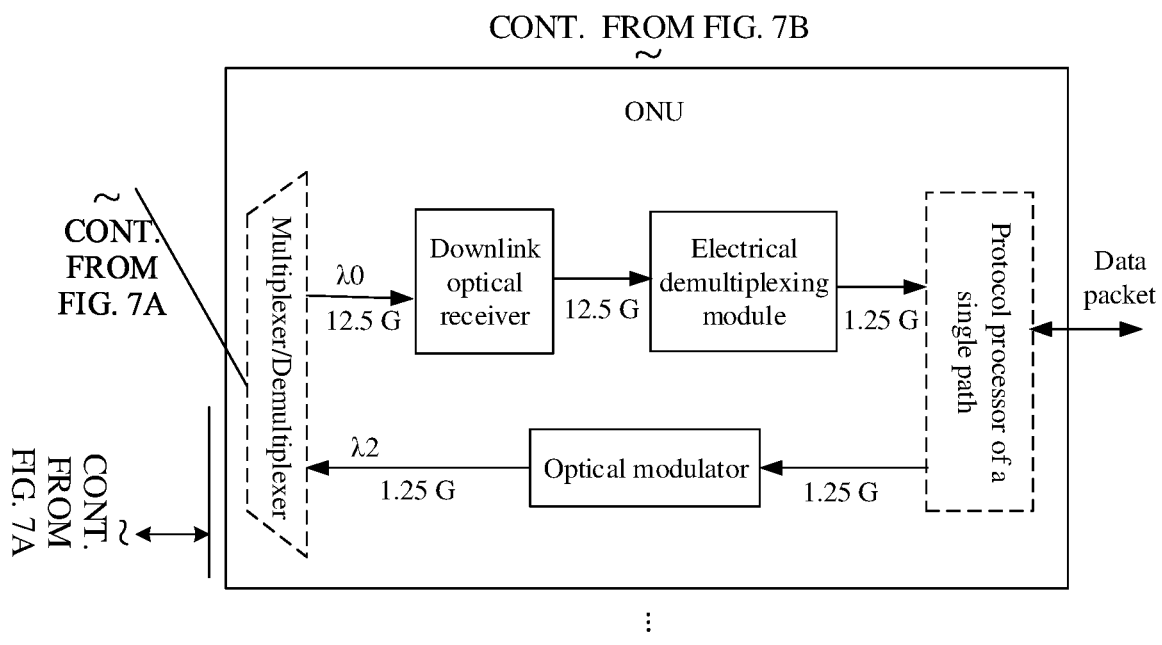

For example, as shown in FIG. 7A to FIG. 7C, an optical communications system 70 shown in FIG. 7A to FIG. 7C is similar to the optical communications system shown in FIG. 5A to FIG. 5C. A difference is, for example, in the optical communications system 70 shown in FIG. 7A to FIG. 7C, $N1=10$, $N2=9$, and $N3=1$, that is, an N+1 risk backup design is used, thereby improving reliability and robustness of the optical communications system.

Figure 8A:
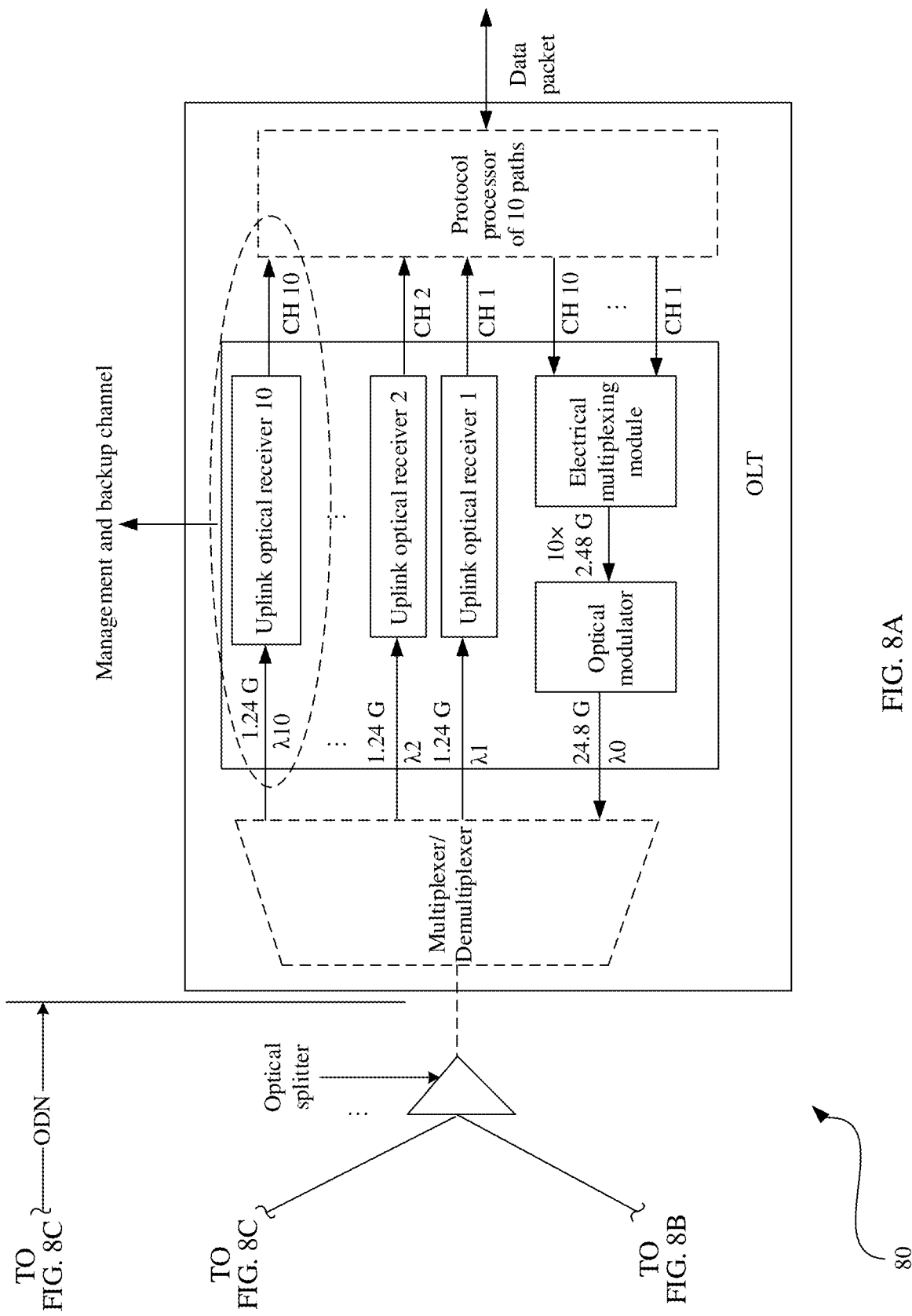
FIG. 8A to FIG. 8C are a fourth example of an optical communications system according to an embodiment of this application.
Figure 8B:
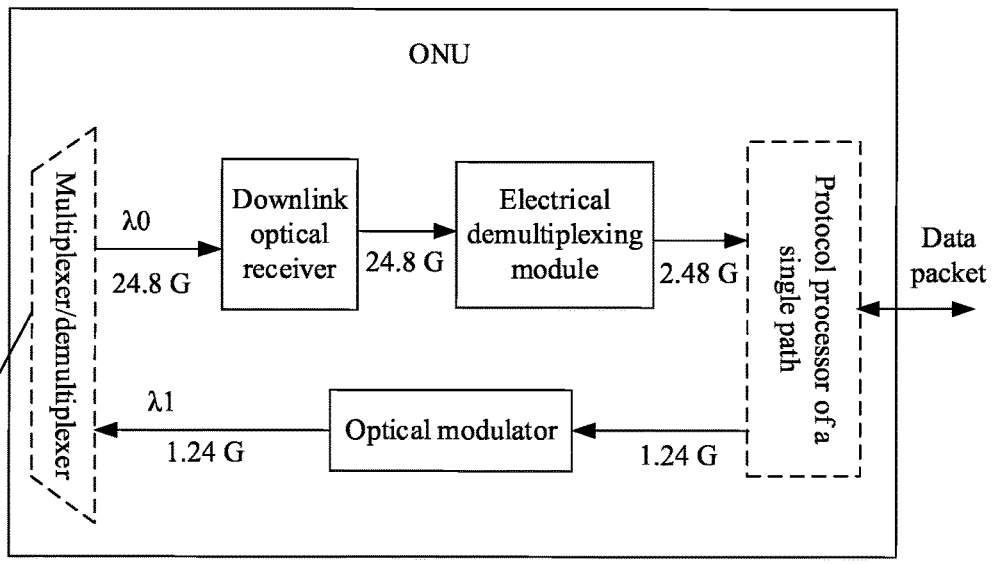
Figure 8C:
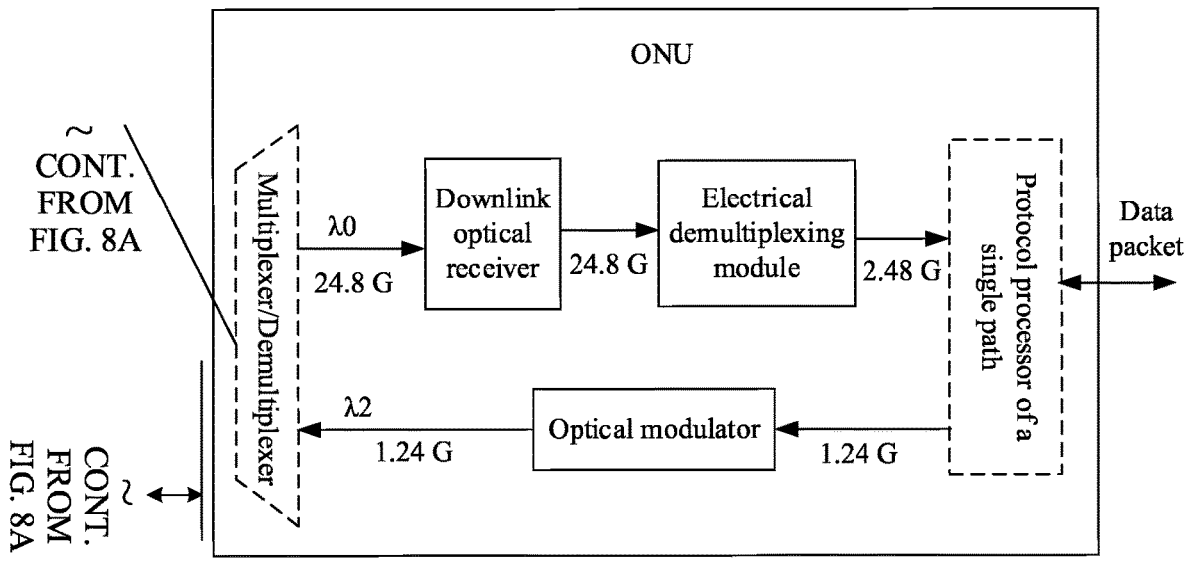

Alternatively, for example, as shown in FIG. 8A to FIG. 8C, an optical communications system 80 shown in FIG. 8A to FIG. 8C is similar to the optical communications system shown in FIG. 6A to FIG. 6C. A difference is, for example, in the optical communications system 80 shown in FIG. 8A to FIG. 8C, $N1=10$, $N2=9$, and $N3=1$, that is, an N+1 risk backup design is used, thereby improving reliability and robustness of the optical communications system.

Figure 9A:
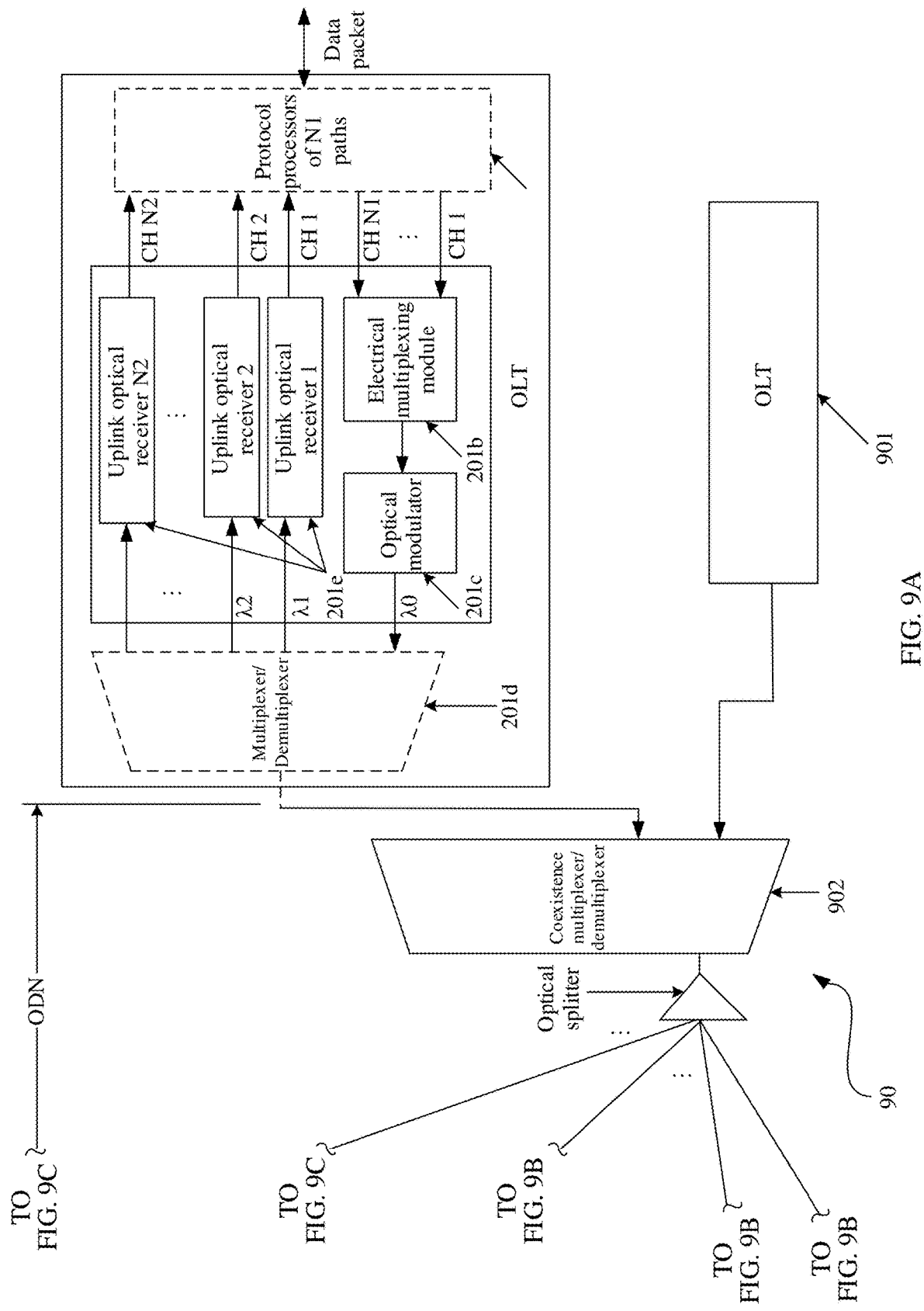
FIG. 9A to FIG. 9C are a schematic diagram of a structure of another optical communications system according to an embodiment of this application.
Figure 9B:
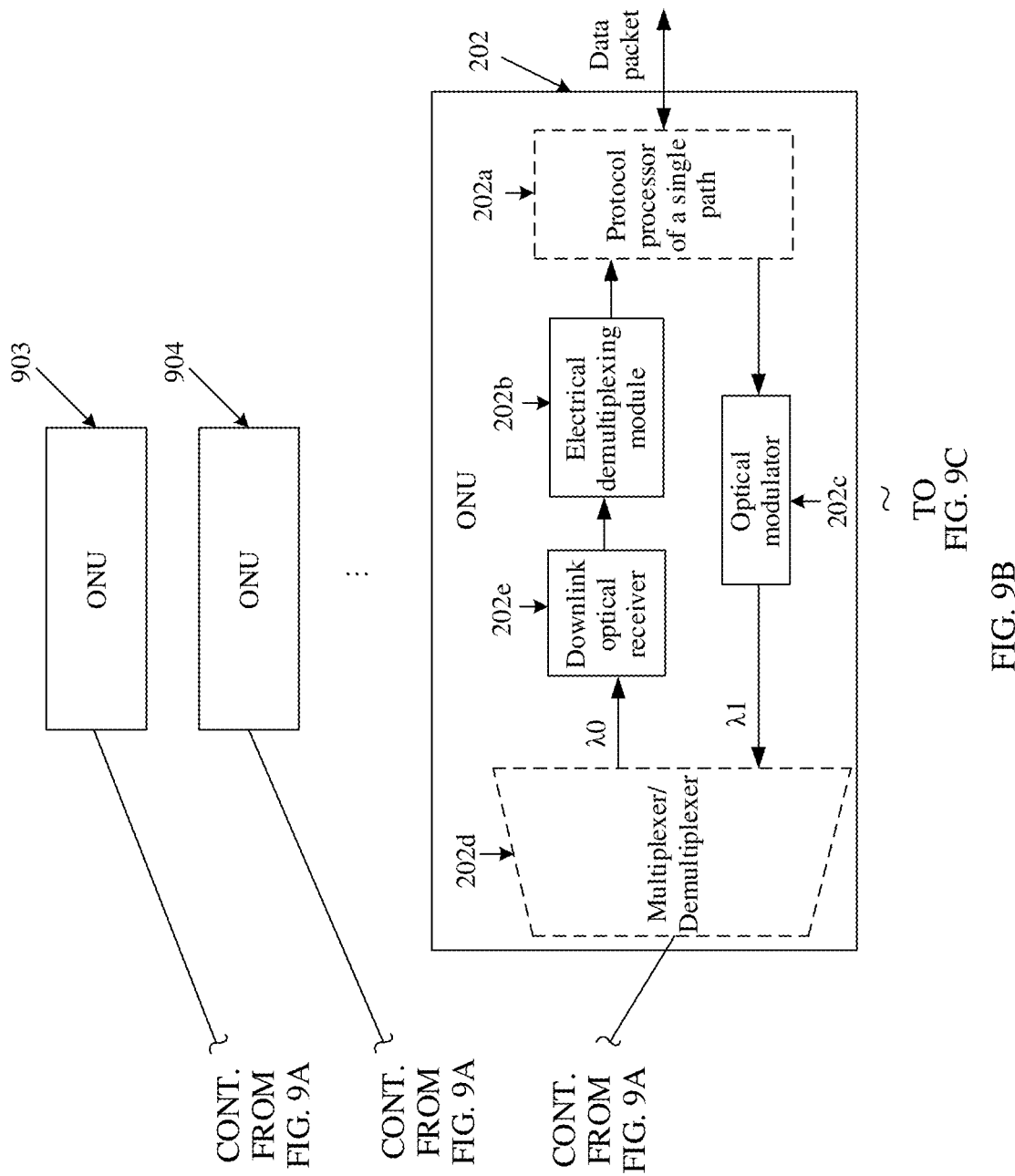
Figure 9C:
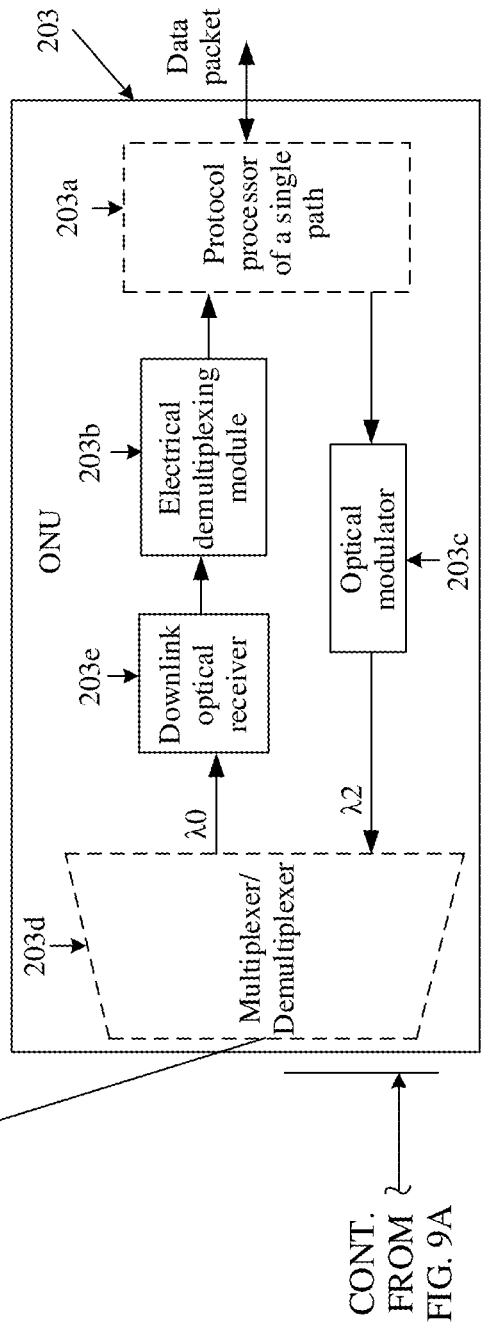

Further, in order to coexist with a TDM-PON system currently designed for an FITH service scenario, as shown in FIG. 9A to FIG. 9C, the optical communications system 90 provided in this embodiment of this application includes the first OLT, the plurality of first ONUs, and the ODN connecting the first OLT and the first ONUs shown in FIG. 2A to FIG. 2C, and may further include a second OLT (an OLT 901 in FIG. 9A to FIG. 9C), a coexisting multiplexer/demultiplexer 902 connecting the first OLT and the second OLT, and one or more second ONUs (an ONU 903 and an ONU 904 in FIG. 9A to FIG. 9C). The ODN is further configured to connect the second OLT and the second ONU, the second OLT is an OLT in the TDM-PON system, and the second ONU is connected to an FTTH user. For a related structure and an operating principle of the second OLT (the OLT 901 in FIG. 9A to FIG. 9C) and the second ONU (the ONU 903 or the ONU 904 in FIG. 9A to FIG. 9C), refer to an existing TDM-PON system. Details are not described herein again. The coexistence multiplexer/demultiplexer 902 may implement coexistence between a PON system (which may be referred to as a TWDM OAS system) designed for a low-latency and high-reliability service provided in this embodiment of this application and a TDM-PON system currently designed for an FTTH service scenario.

Figure 10A:
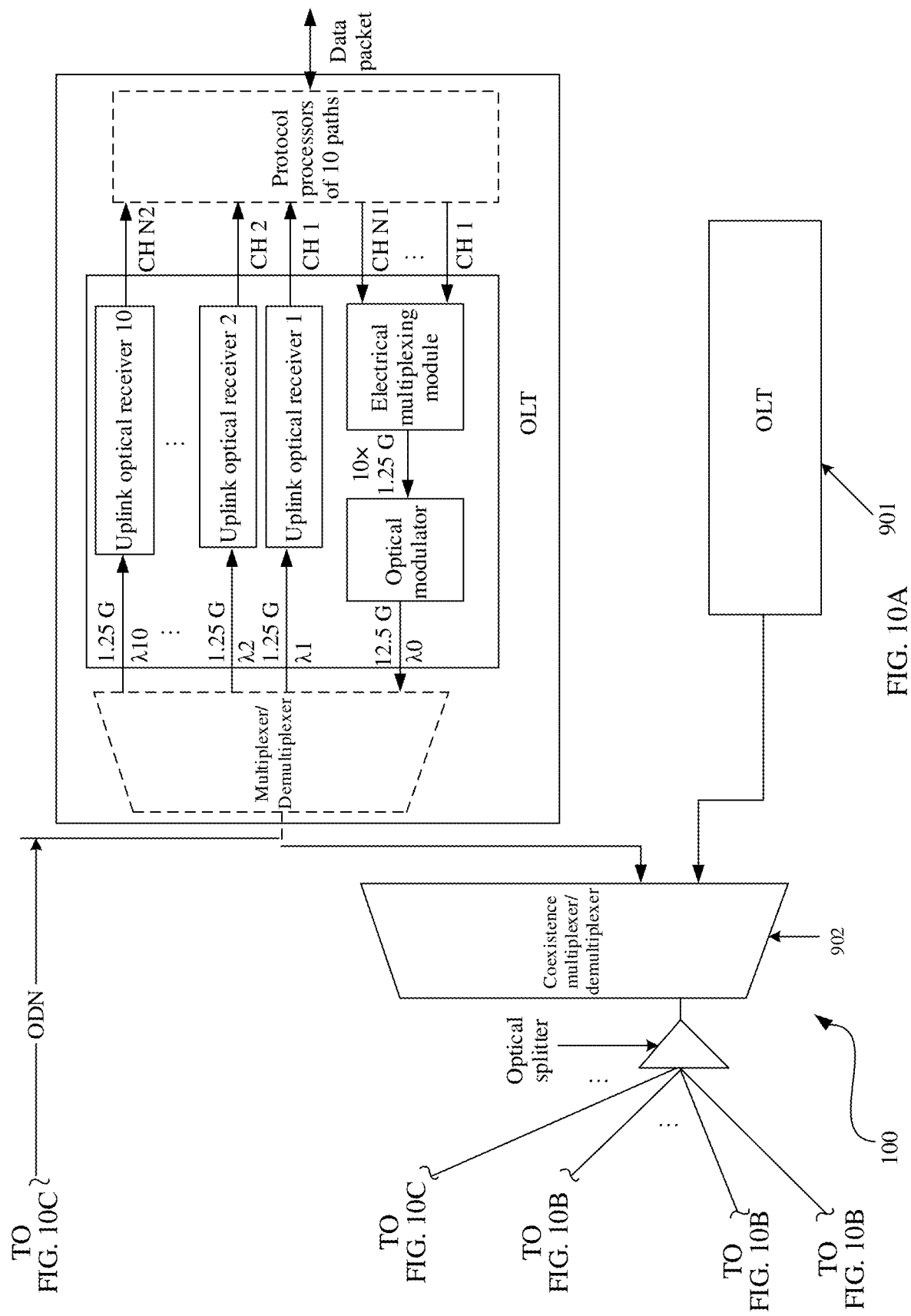
FIG. 10A to FIG. 10C are a fifth example of an optical communications system according to an embodiment of this application.
Figure 10B:
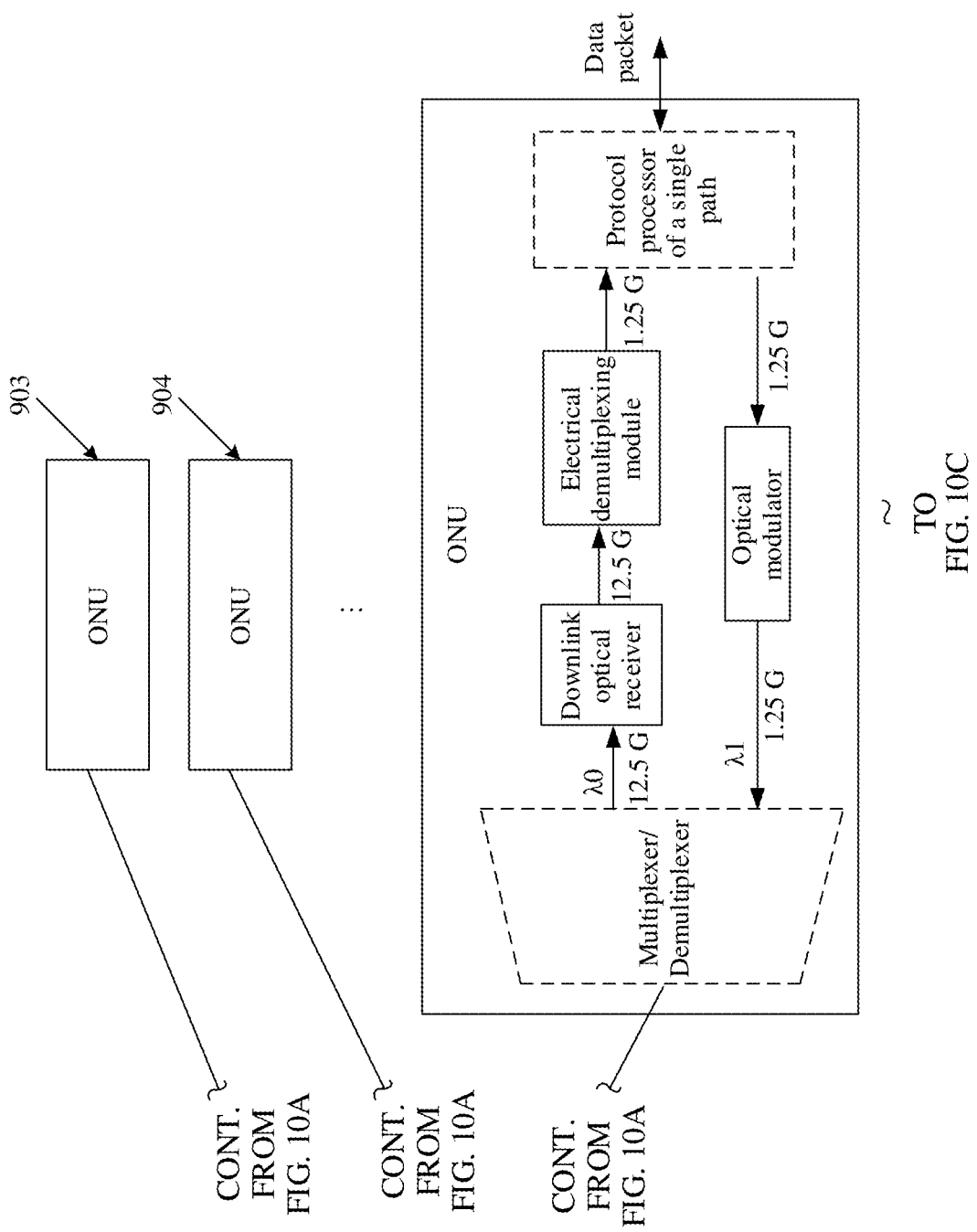
Figure 10C:
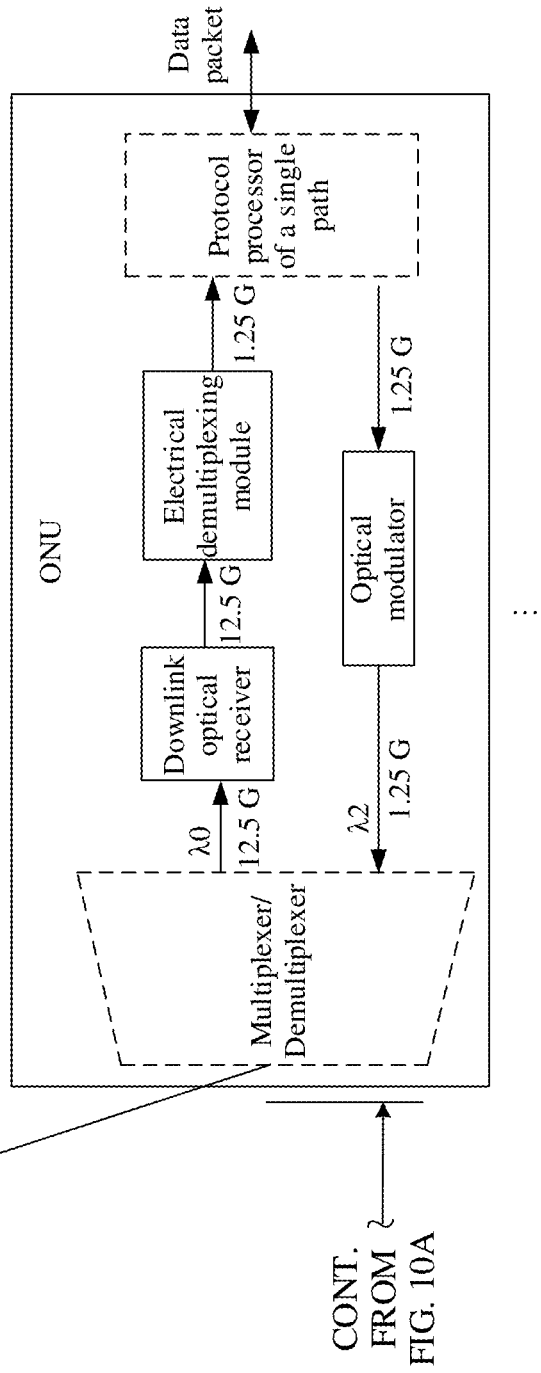

For example, the optical communications system 100 shown in FIG. 10A to FIG. 10C includes the first OLT, the plurality of first ONUs, and the ODN connecting the first OLT and the first ONUs in the optical communications system 50 shown in FIG. 5A to FIG. 5C, and may further include the second OLT (for example, the OLT 901), a coexistence multiplexer/demultiplexer 902 connecting the first OLT and the second OLT, and one or more second ONUs (for example, the ONU 903 and the ONU 904).

Figure 11A:
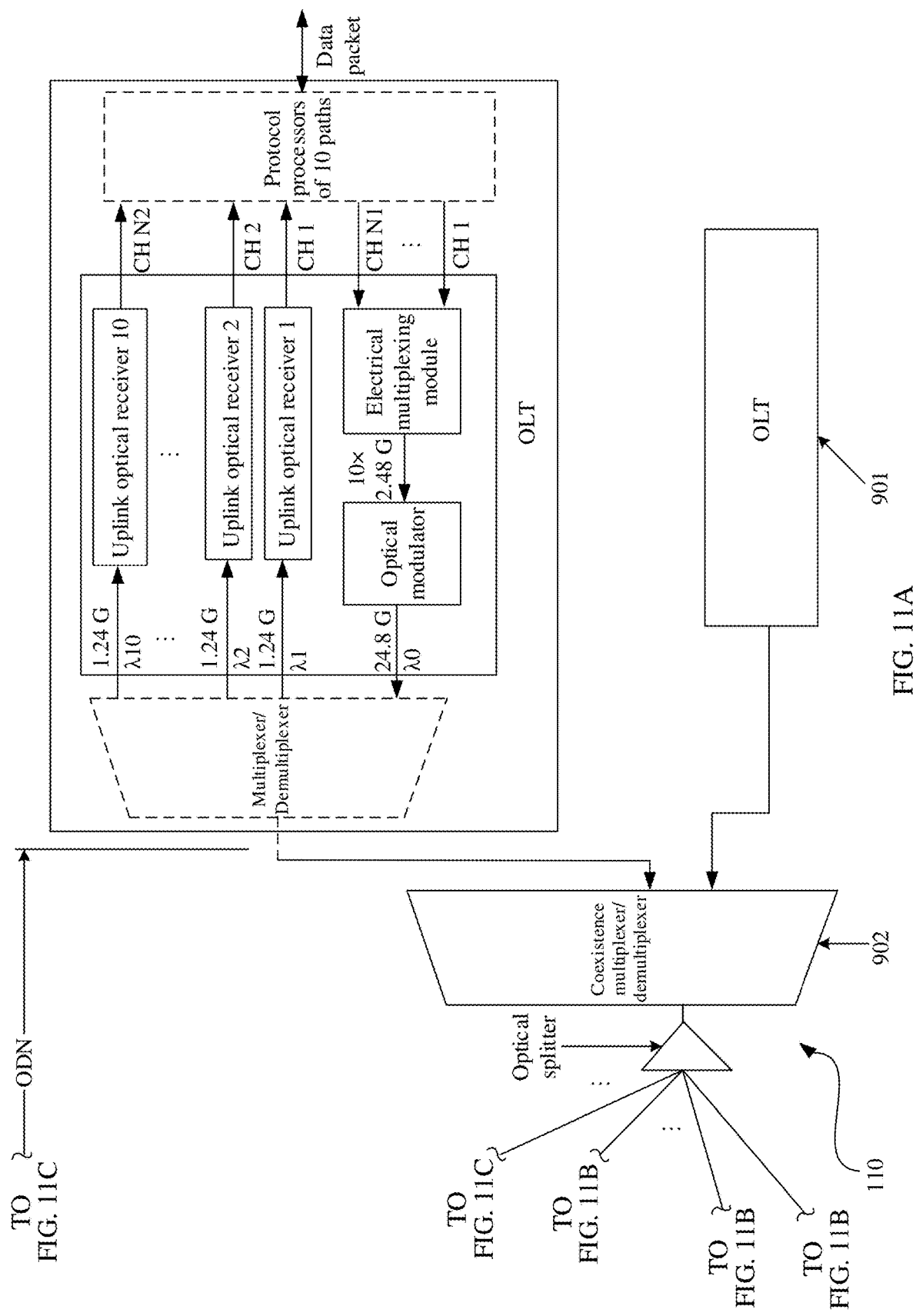
FIG. 11A to FIG. 11C are a sixth example of an optical communications system according to an embodiment of this application.
Figure 11B:
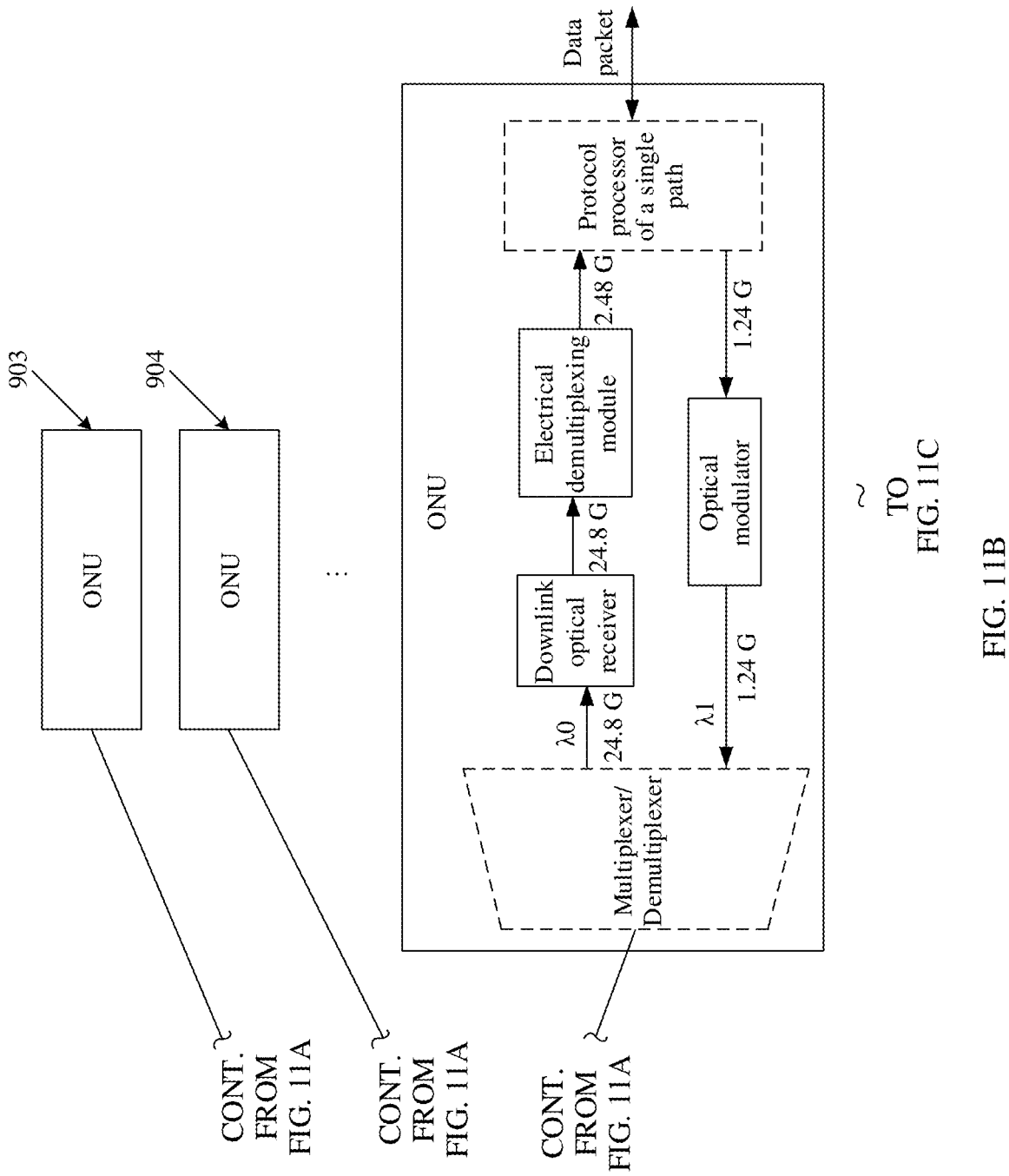
Figure 11C:
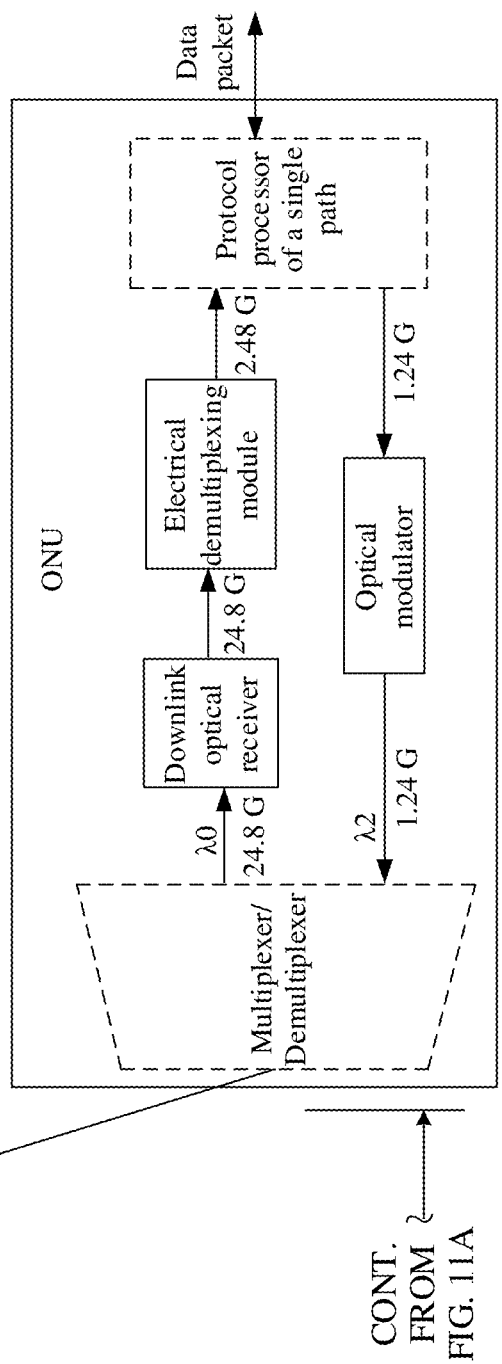

Alternatively, for example, the optical communications system 110 shown in FIG. 11A to FIG. 11C includes the first OLT, the plurality of first ONUs, and the ODN connecting the first OLT and the first ONUs in the optical communications system 60 shown in FIG. 6A to FIG. 6C, and may further include the second OLT (for example, the OLT 901), a coexistence multiplexer/demultiplexer 902 connecting the first OLT and the second OLT, and one or more second ONUs (for example, the ONU 903 and the ONU 904).

Figure 12A:
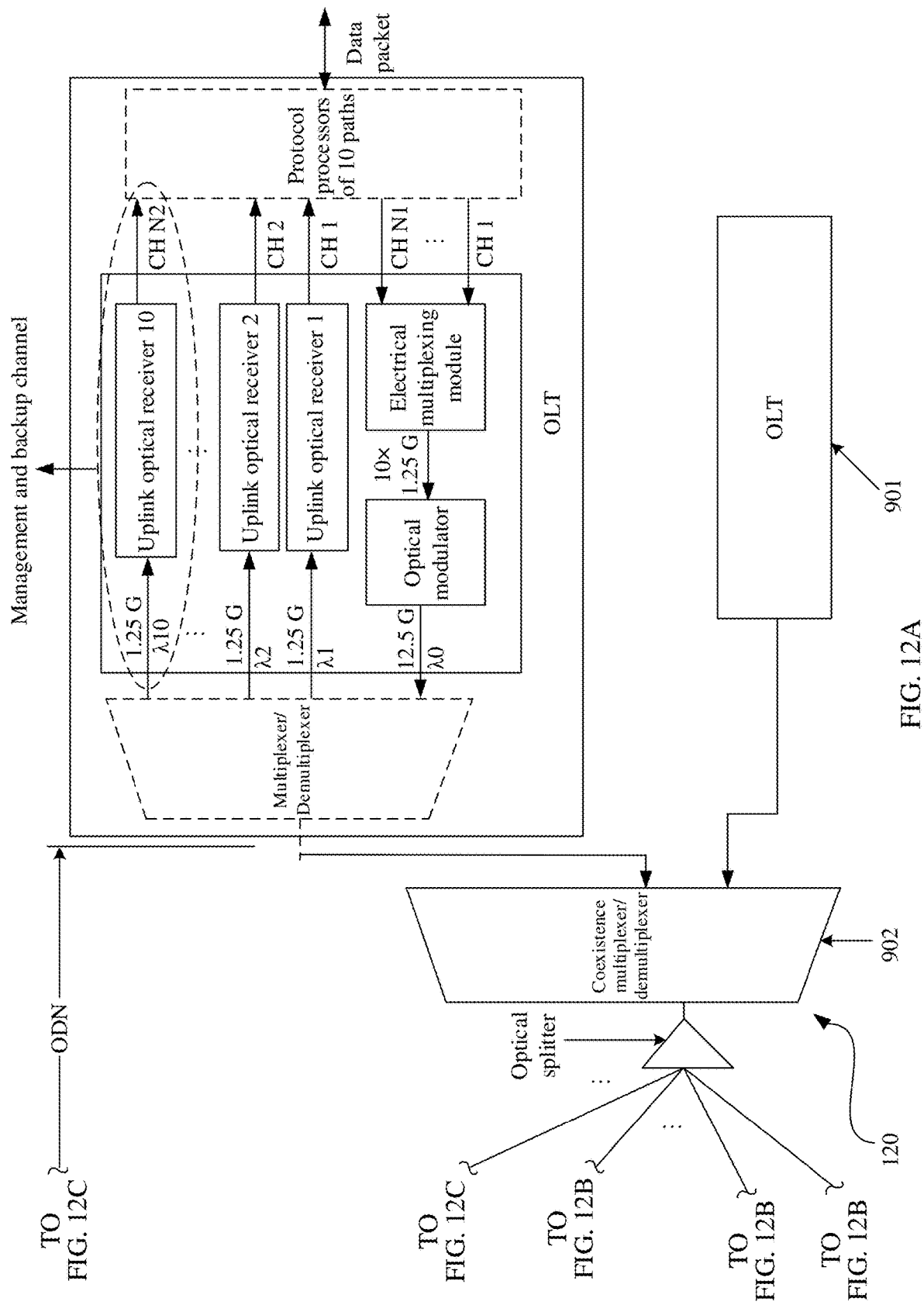
FIG. 12A to FIG. 12C are a seventh example of an optical communications system according to an embodiment of this application.
Figure 12B:
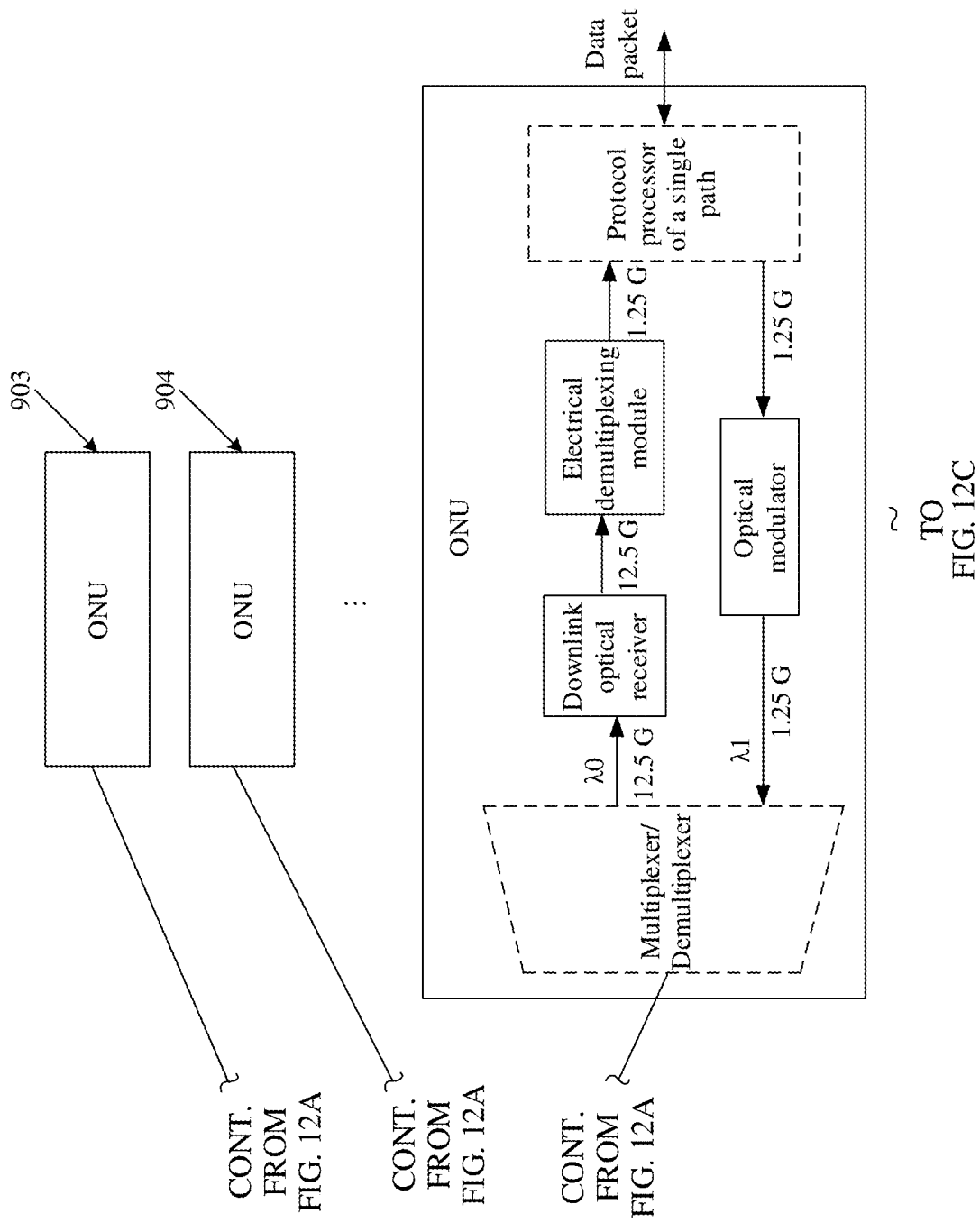
Figure 12C:
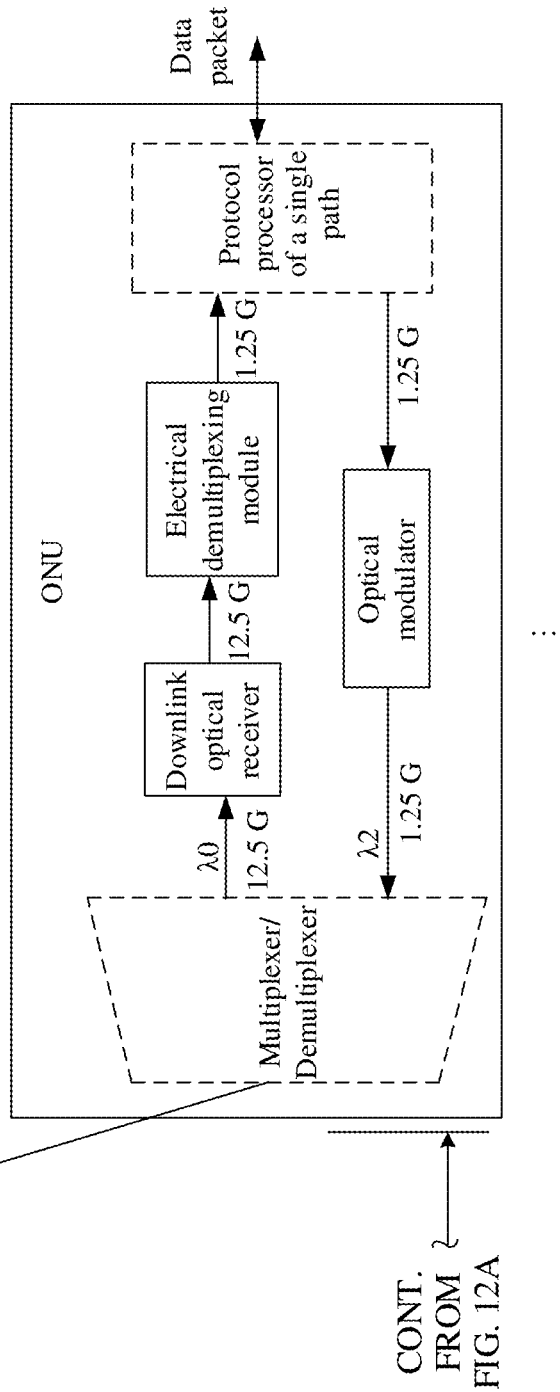

Alternatively, for example, the optical communications system 120 shown in FIG. 12A to FIG. 12C includes the first OLT, the plurality of first ONUs, and the ODN connecting the first OLT and the first ONUs in the optical communications system 70 shown in FIG. 7A to FIG. 7C, and may further include the second OLT (for example, the OLT 901), a coexistence multiplexer/demultiplexer 902 connecting the first OLT and the second OLT, and one or more second ONUs (for example, the ONU 903 and the ONU 904).

Figure 13A:
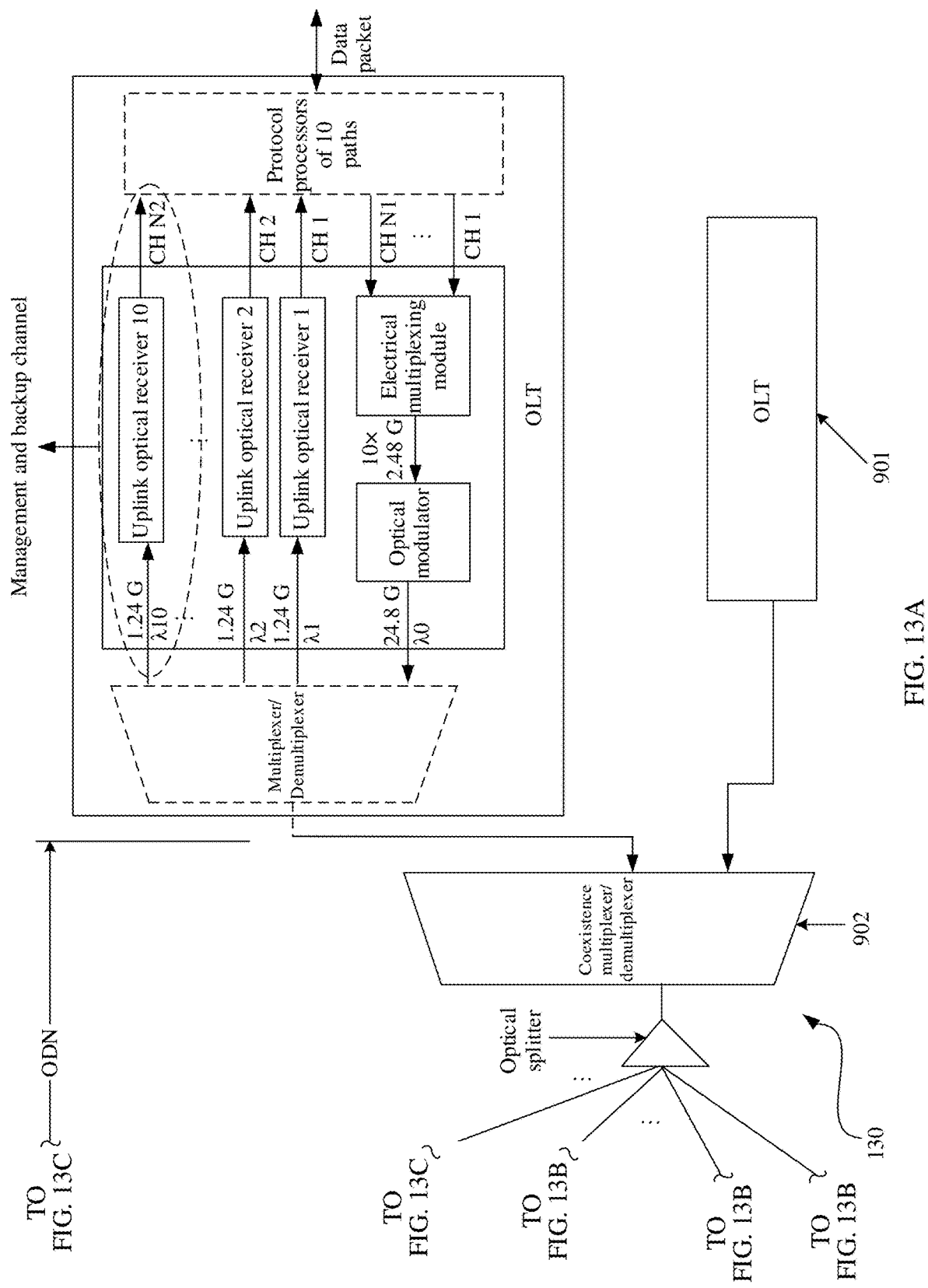
FIG. 13A to FIG. 13C are an eighth example of an optical communications system according to an embodiment of this application.
Figure 13B:
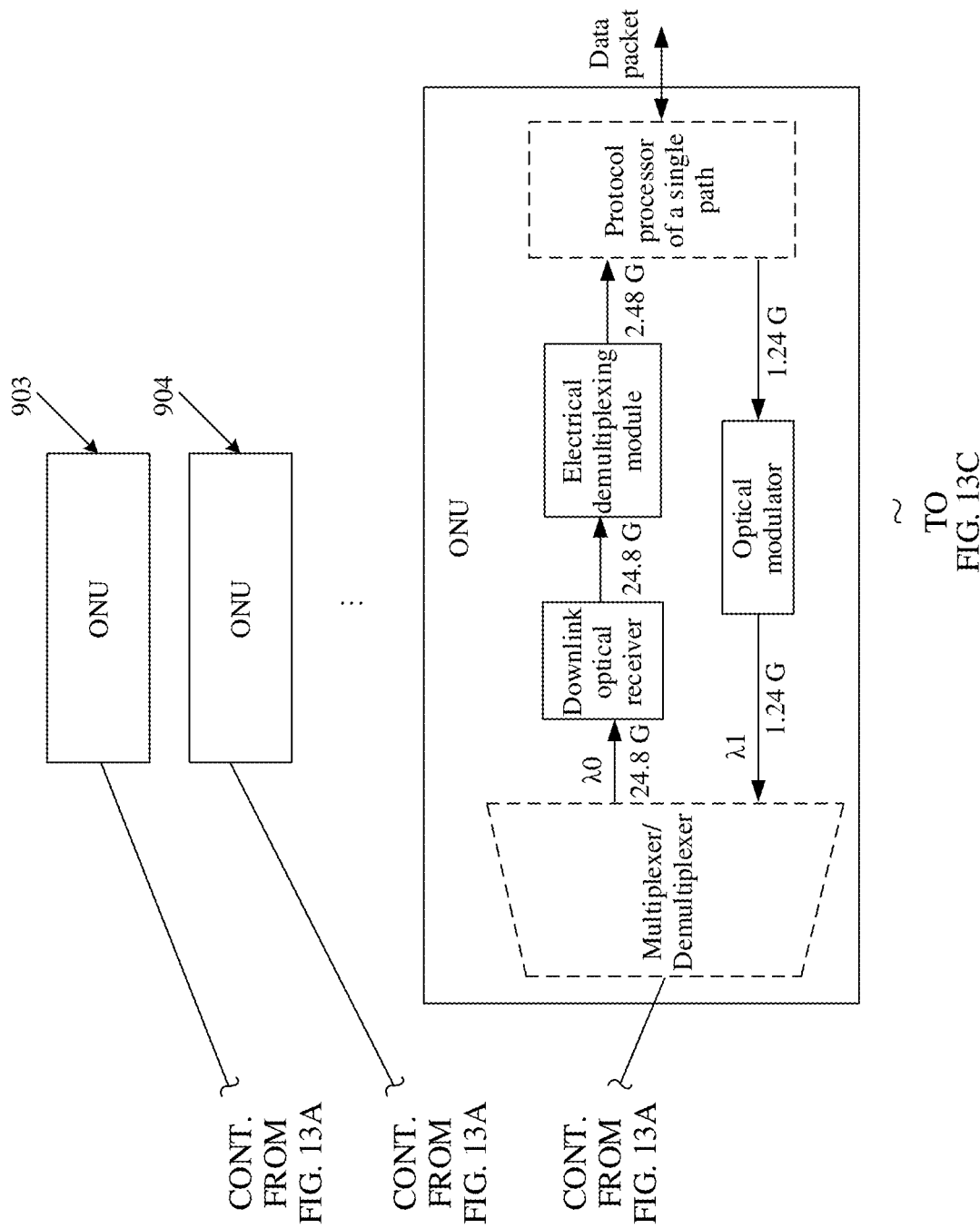
Figure 13C:
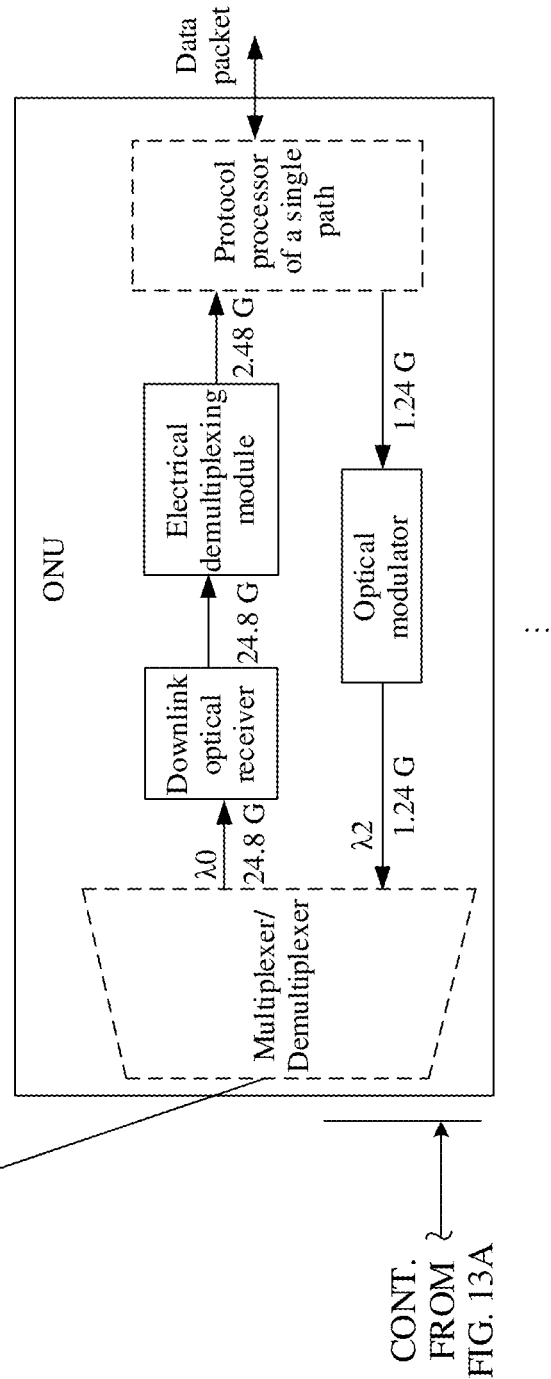

Alternatively, for example, the optical communications system 130 shown in FIG. 13A to FIG. 13C includes the first OLT, the plurality of first ONUs, and the ODN connecting the first OLT and the first ONUs in the optical communications system 80 shown in FIG. 8A to FIG. 8C, and may further include the second OLT (for example, the OLT 901), a coexistence multiplexer/demultiplexer 902 connecting the first OLT and the second OLT, and one or more second ONUs (for example, the ONU 903 and the ONU 904).

Although this application is described with reference to specific features and the embodiments thereof, it is clear that various modifications and combinations may be made to them without departing from the spirit and scope of this application. Correspondingly, this specification and the accompanying drawings are merely example descriptions of this application defined by the appended claims, and are considered as any of or all modifications, variations, combinations, or equivalents that cover the scope of this application. Clearly, a person skilled in the art can make various modifications and variations to this application without departing from the spirit and scope of this application. In this way, this application is intended to cover these modifications and variations of this application provided that they fall within the scope of the claims of this application and equivalent technologies thereof.

What is claimed is:

1. A first optical line terminal (OLT), comprising:
an electrical multiplexer, configured to receive downlink data frames of M1 paths, and multiplex the downlink data frames of the M1 paths into one high-speed downlink bit stream, wherein M1 is a positive integer;
a first optical modulator, configured to convert the one high-speed downlink bit stream into a physical electrical signal, and modulate the physical electrical signal into a downlink optical signal having a wavelength of $\lambda o$;
N2 uplink optical receivers, wherein N2 is a positive integer greater than 1, and wherein different optical receivers in the N2 uplink optical receivers are configured to receive uplink optical signals of different wavelengths; and
N3 uplink optical receivers, wherein N3 is a positive integer, and wherein a channel in which the other N3 uplink optical receivers are located is a management and backup channel.

2. The first OLT according to claim 1, wherein rates of the downlink data frames of the M1 paths are all D, and a rate of the one high-speed downlink bit stream is M1×D.

3. The first OLT according to claim 1, wherein the electrical multiplexer is configured to multiplex the downlink data frames of the M1 paths into the one high-speed downlink bit stream in a bit interleaving manner, wherein the one high-speed downlink bit stream comprises one or a plurality of M1 bit groups, and the one M1 bit group or a $k^{th}$ M1 bit group in the plurality of M1 bit groups comprises a $k^{th}$ bit in the downlink data frames of the M1 paths.

4. The first OLT according to claim 1, further comprising:
protocol processors of N1 paths, wherein N1 is a positive integer greater than or equal to M1, wherein the protocol processors of the N1 paths are configured to:
receive downlink data packets of M1 paths, and output the downlink data frames of the M1 paths after separately processing the downlink data packets of the M1 paths; and
receive uplink electrical signals of N2 paths, convert the uplink electrical signals of the N2 paths into uplink data frames of N2 paths, and complete parsing and protocol processing of the uplink data frames of the N2 paths, to obtain user data packets of the N2 paths.

5. The first OLT according to claim 4, wherein N1=M1.

6. The first OLT according to claim 4, wherein N1=N2.

7. The first OLT according to claim 4,
wherein N1=N2+N3, and the N3 uplink optical receivers are different uplink optical receivers than the N2 uplink optical receivers.

8. A first optical network unit (ONU), comprising:
a downlink optical receiver, configured to receive a downlink optical signal having a wavelength of $\lambda o$, and convert the downlink optical signal into a downlink electrical signal;
an electrical de-multiplexer, configured to convert the downlink electrical signal into a high-speed downlink bit stream, and extract a target downlink bit stream belonging to the electrical de-multiplexer from the high-speed downlink bit stream, wherein at least one downlink bitstream of the high-speed downlink bitstream is associated with a management and backup channel; and
a second optical modulator, configured to, after receiving an uplink bit stream and converting the uplink bit stream into a physical electrical signal, modulate the physical electrical signal into an uplink optical signal having a wavelength of $\lambda i$, wherein $\lambda i$ is different from $\lambda t$, and $\lambda t$ is a wavelength of another uplink optical signal received by a first optical line terminal (OLT) connected to the first ONU.

9. The first ONU according to claim 8, wherein the high-speed downlink bit stream comprises one or a plurality of M1 bit groups, and the one M1 bit group or a $k^{th}$ M1 bit group in the plurality of M1 bit groups comprises a $k^{th}$ bit in downlink data frames of M1 paths; and
wherein the electrical de-multiplexer is configured to extract, from the high-speed downlink bit stream in a bit deinterleaving manner, the target downlink bit stream belonging to the electrical de-multiplexer, wherein the target downlink bit stream comprises a corresponding bit in the one M1 bit group or in each bit group in the plurality of M1 bit groups.

10. The first ONU according to claim 8, wherein $\lambda i$ is configured according to a configuration instruction sent by the first OLT in a downlink direction.

11. An optical communications system, comprising:
a first optical line terminal (OLT), comprising:
an electrical multiplexer, configured to receive downlink data frames of M1 paths, and multiplex the downlink data frames of the M1 paths into one first high-speed downlink bit stream, wherein M1 is a positive integer;
a first optical modulator, configured to convert the one first high-speed downlink bit stream into a physical electrical signal, and modulate the physical electrical signal into a downlink optical signal having a wavelength of $\lambda o$;
N2 uplink optical receivers, wherein N2 is a positive integer greater than 1, and different optical receivers in the N2 uplink optical receivers are configured to receive uplink optical signals of different wavelengths; and
N3 uplink optical receivers, wherein N3 is a positive integer, and wherein a channel in which the other N3 uplink optical receivers are located is a management and backup channel;
a plurality of first optical network units (ONUs) including a first ONU, wherein the first ONU comprises:
a downlink optical receiver, configured to receive a downlink optical signal having a wavelength of $\lambda o$, and convert the downlink optical signal into a downlink electrical signal;
an electrical de-multiplexer, configured to convert the downlink electrical signal into a second high-speed downlink bit stream, and extract one target downlink bit stream belonging to the electrical de-multiplexer from the second high-speed downlink bit stream; and
a second optical modulator, configured to, after receiving an uplink bit stream and converting the uplink bit stream into a physical electrical signal, modulate the physical electrical signal into an uplink optical signal having a wavelength of $\lambda i$, wherein $\lambda i$ is different from $\lambda t$, and $\lambda t$ is a wavelength of another uplink optical signal received by the first OLT; and
an optical distribution network (ODN) connecting the first OLT and the plurality of first ONUs.

12. The optical communications system according to claim 11, further comprising a second OLT, a coexistence multiplexer/demultiplexer connecting the first OLT and the second OLT, and one or more second ONUs, wherein the ODN is further configured to connect the second OLT and the second ONU, the second OLT is an OLT in a fiber to the home (FTTH) passive optical network (PON) system, and the second ONU is connected to an FTTH user.

13. The optical communications system according to claim 11, wherein rates of the downlink data frames of the M1 paths are all D, and a rate of the one first high-speed downlink bit stream is M1×D.

14. The optical communications system according to claim 11, wherein the electrical multiplexer is configured to multiplex the downlink data frames of the M1 paths into the one first high-speed downlink bit stream in a bit interleaving manner, wherein the one first high-speed downlink bit stream comprises one or a plurality of M1 bit groups, and the one M1 bit group or a $k^{th}$ M1 bit group in the plurality of M1 bit groups comprises a $k^{th}$ bit in the downlink data frames of the M1 paths.

15. The optical communications system according to claim 11, wherein the first OLT further comprises:
protocol processors of N1 paths, wherein N1 is a positive integer greater than or equal to M1, wherein the protocol processors of the N1 paths are configured to:
receive downlink data packets of M1 paths, and output the downlink data frames of the M1 paths after separately processing the downlink data packets of the M1 paths; and
receive uplink electrical signals of N2 paths, convert the uplink electrical signals of the N2 paths into uplink data frames of N2 paths, and complete parsing and protocol processing of the uplink data frames of the N2 paths, to obtain user data packets of the N2 paths.

16. The optical communications system according to claim 15, wherein N1=M1.

17. The optical communications system according to claim 15, wherein N1=N2.

18. The optical communications system according to claim 11, wherein
N1=N2+N3, and the N3 uplink optical receivers are different uplink optical receivers than the N2 uplink optical receivers.

19. The optical communications system according to claim 11, wherein the second high-speed downlink bit stream comprises one or a plurality of M1 bit groups, and the one M1 bit group or a $k^{th}$ M1 bit group in the plurality of M1 bit groups comprises a $k^{th}$ bit in the downlink data frames of the M1 paths; and
wherein the electrical de-multiplexer is configured to extract, from the second high-speed downlink bit stream in a bit deinterleaving manner, the target downlink bit stream belonging to the electrical de-multiplexer, wherein the target downlink bit stream comprises a corresponding bit in the one M1 bit group or in each bit group in the plurality of M1 bit groups.

20. The optical communications system according to claim 11, wherein $\lambda i$ is configured according to a configuration instruction sent by the first OLT in a downlink direction.

* * * * *